(12) United States Patent
Tatara et al.

(10) Patent No.: US 6,988,572 B2
(45) Date of Patent: Jan. 24, 2006

(54) HYBRID VEHICLE

(75) Inventors: Yusuke Tatara, Tokyo (JP); Toshihiko Fukuda, Utsunomiya (JP); Tomofumi Ikematsu, Utsunomiya (JP); Tetsuya Hasebe, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 194 days.

(21) Appl. No.: 10/442,133

(22) Filed: May 21, 2003

(65) Prior Publication Data

US 2003/0217877 A1 Nov. 27, 2003

(30) Foreign Application Priority Data

May 23, 2002 (JP) ............................. 2002-149727

(51) Int. Cl.
*B60K 1/00* (2006.01)
(52) U.S. Cl. ......................................... 180/65.2; 477/5
(58) Field of Classification Search ............... 180/65.2; 477/5, 6; 701/67, 69
See application file for complete search history.

(56) References Cited

U.S. PATENT DOCUMENTS

| 5,755,303 | A | * | 5/1998 | Yamamoto et al. | ........ 180/65.2 |
| 6,244,368 | B1 | | 6/2001 | Ando et al. | |
| 6,283,086 | B1 | * | 9/2001 | Yamamoto et al. | ..... 123/198 D |
| 6,317,665 | B1 | | 11/2001 | Tabata et al. | |
| 6,342,027 | B1 | | 1/2002 | Suzuki | |
| 6,823,250 | B2 | * | 11/2004 | Yamaguchi et al. | .......... 701/51 |
| 2002/0062183 | A1 | * | 5/2002 | Yamaguchi et al. | .......... 701/22 |

FOREIGN PATENT DOCUMENTS

| DE | 195 32 136 A 1 | 3/1997 |
| EP | 1 090 792 A2 | 4/2001 |
| FR | 2 784 944 | 4/2000 |
| JP | 06-017727 | 1/1994 |
| JP | 07-174220 | 7/1995 |
| JP | 09-004479 | 1/1997 |
| JP | 10-212983 | 8/1998 |
| JP | 11-350995 | 12/1999 |
| JP | 2000-120858 | 4/2000 |
| JP | 2000-224714 | 8/2000 |
| JP | 2000-255285 | * 9/2000 |
| JP | 2001-012517 | 1/2001 |
| JP | 2001-018686 | 1/2001 |

OTHER PUBLICATIONS

Japanese Office Action with English translation.

* cited by examiner

*Primary Examiner*—Bryan Fischmann
(74) *Attorney, Agent, or Firm*—Arent Fox PLLC

(57) ABSTRACT

A hybrid vehicle having an engine and a motor as power sources that generate electrical power, and an output shaft to which driving power from at least one of the engine and the motor is transmitted for driving the vehicle. The vehicle may be driven in an engine cruise mode wherein the vehicle is driven only by the engine, or in a motor cruise mode wherein the vehicle is driven only by the motor. A clutch section provided between the engine and motor and a pair of axle shafts selectively disconnects the driving powers of the engine and the motor. A control section controls the clutch section, wherein the driving mode of the vehicle is alternately switched between the engine cruise mode and the motor cruise mode. As such, an engagement degree of the clutch section is decreased at switching, and then gradually increased until it is totally recovered.

4 Claims, 16 Drawing Sheets

HYBRID VEHICLE

BACKGROUND OF THE INVENTION

1. Field of the Invention

The present invention relates to a vehicle, generally known as a hybrid vehicle, which comprises, as power sources, an engine and a motor, the motor also being capable of generating electrical energy, the vehicle obtaining driving power from at least one of the engine and the motor.

2. Description of the Related Art

In recent years, in order to conserve fuel in the running of engines, or to reduce exhaust gas produced by combustion of fuel, hybrid vehicles have been developed, each of which comprises an engine and a motor, the motor also being capable of generating electrical energy (hereinafter referred to as a motor-generator) that are connected to a power transmission mechanism connected to driving wheels, and in which the motor-generator produces supplemental driving power depending on demand during normal travel of the vehicle, and the motor-generator is connected to the driving wheels so as to convert a portion of the kinetic energy of the vehicle into electrical energy, which is generally known as "regenerated energy", and which is stored in a battery device (refer to, for example, Japanese Unexamined Patent Application, First Publication No. Hei 11-350995).

In such hybrid vehicles, a hybrid vehicle is also known, in which an engine and a motor-generator are directly connected to each other. Conventionally, in such a hybrid vehicle, the motor-generator is not used solely for driving the vehicle (hereinafter this driving mode is referred to as a "motor cruise mode") because, in a motor cruise mode, the engine is a portion of the load for the motor-generator, and the motor-generator must produce power to compensate for the pumping loss and friction of the engine; therefore, fuel efficiency may not be improved when compared with the case in which the engine is used solely for driving the vehicle (hereinafter this driving mode is referred to as an "engine cruise mode").

In the next development stage, a technology for reducing pumping loss of an engine has been developed, in which the operations of intake and exhaust valves of an engine are temporarily suspended. In the case of hybrid vehicles, it has been discovered that fuel efficiency can be improved by temporarily suspending the operations of intake and exhaust valves of an engine during a motor cruise mode so as to reduce pumping loss of the engine, even though the motor-generator is used solely for driving the vehicle and for compensating for engine friction when compared with the case of an engine cruise mode.

A hybrid vehicle, in which a motor is capable of driving the vehicle while stopping the operations of intake and exhaust valves of an engine, is disclosed in Japanese Unexamined Patent Application, First Publication No. Hei 09-4479.

In such a hybrid vehicle which may be driven by a motor, a problem is encountered in that an unexpected deceleration feeling or jolt (hereinafter referred to as a drag feeling) is experienced when the driving mode of the vehicle is switched between the motor cruise mode and the engine cruise mode, alternately.

More specifically, when the driving mode of the vehicle is switched from the engine cruise mode to the motor cruise mode, a drag feeling is experienced due to cut of fuel supply to the engine along with a jolt (vehicle vibration) due to changes in the engine friction by stopping the operations of the intake and exhaust valves. On the other hand, when the driving mode of the vehicle is switched from the motor cruise mode to the engine cruise mode, another drag feeling is experienced due to changes in the engine friction by starting the operations of the intake and exhaust valves along with a combustion initiation jolt due to start (ignition) of the engine operation.

SUMMARY OF THE INVENTION

In consideration of the above circumstances, an object of the present invention is to provide a hybrid vehicle in which drivability is improved, and in which vehicle behavior is stable even when switching back and forth between an engine cruise mode and a motor cruise mode.

In order to achieve the above object, the present invention provides a hybrid vehicle comprising: an engine and a motor being capable of generating electrical power as power sources; an output shaft to which at least one of the driving powers of the engine and a motor is transmitted for driving the vehicle in an engine cruise mode in which the vehicle is driven by the engine, or in a motor cruise mode in which the vehicle is driven by the motor; a clutch section provided between the engine and motor and right and left axles shafts (i.e. other output shafts), and which is adapted to selectively disconnect the driving powers of the engine and the motor; and a control section which is adapted to control the clutch section, when the driving mode of the vehicle is switched between the engine cruise mode and the motor cruise mode alternately, so that the engagement degree of the clutch section is once decreased at switching, and then the decreased engagement degree of the clutch section is gradually increased and recovered.

According to the hybrid vehicle configured as described above, the motor cruise mode can be effectively used in a driving state in which the engine cannot run with high efficiency. In addition, when the driving mode of the vehicle is switched from the engine cruise mode to the motor cruise mode, a drag feeling due to a fuel cut operation can be reduced, and when the driving mode of the vehicle is switched from the motor cruise mode to the engine cruise mode, a combustion initiation jolt due to start of the engine operation can be also reduced.

In the above hybrid vehicle, the control section may further be adapted to control the engine so as to deactivate at least one of the cylinders of the engine during the motor cruise mode.

According to the hybrid vehicle configured as described above, the pumping loss of the engine can be reduced during the motor cruise mode. In addition, a vehicle jolt, which is caused by changes in the friction of the engine due to stop or start of the operations of the intake and exhaust valves when the driving mode of the vehicle is switched between the engine cruise mode and the motor cruise mode, can be reduced by controlling the clutch section in a manner described above.

In this case, the cylinder deactivation operation may be executed on either all of the cylinders, or some of the cylinders.

In the above hybrid vehicle, the control section may be further adapted to control the driving power of the motor, when the driving mode of the vehicle is switched from the engine cruise mode to the motor cruise mode, so as to compensate for changes in the friction of the engine due to the cylinder deactivation operation.

According to the hybrid vehicle configured as described above, a vehicle jolt, which is caused by changes in the friction of the engine due to stop of the operations of the intake and exhaust valves when the driving mode of the vehicle is switched from the engine cruise mode to the motor cruise mode, can be eliminated.

In the above hybrid vehicle, the control section may further be adapted to control the engine and motor so that the driving mode of the vehicle is not switched from the engine cruise mode to the motor cruise mode during a predetermined time period from the beginning of the engine cruise mode.

According to the hybrid vehicle configured as described above, a frequent switching of the driving mode between the engine cruise mode and the motor cruise mode, i.e., a hunting phenomenon, can be prevented.

The above hybrid vehicle may further comprise a driving mode determining section which sets the driving mode of the vehicle either in the engine cruise mode or in the motor cruise mode by comparing a desired driving power, which is determined by the traveling speed of the vehicle and opening degree of an accelerator or of a throttle pedal, with a predetermined driving power obtainable from the motor.

According to the hybrid vehicle configured as described above, the driving mode of the vehicle can be switched depending on the determination result in the driving mode determining section, i.e., the motor cruise mode is selected when the desired driving power is equal to or less than the driving power obtainable from the motor, and the engine cruise mode is selected when the desired driving power is greater than the driving power obtainable from the motor.

In the above hybrid vehicle, the driving mode determining section may comprise a filter which is used to limit a range of change of the desired driving power when the desired driving power is determined.

According to the hybrid vehicle configured as described above, a frequent switching of the driving mode between the engine cruise mode and the motor cruise mode, i.e., a hunting phenomenon, can be prevented.

In the above hybrid vehicle, the control section may be further adapted to control the engine so that fuel supply to the engine is stopped when the driving mode of the vehicle is switched from the engine cruise mode to the motor cruise mode, and the control section may be further adapted to control the motor so that the driving power of the motor is increased so as to compensate for the friction of the engine due to the fuel cut operation.

DESCRIPTION OF THE PREFERRED EMBODIMENTS

An embodiment of the hybrid vehicle according to the present invention will be explained below with reference to FIGS. 1 to 18.

Figure 1:
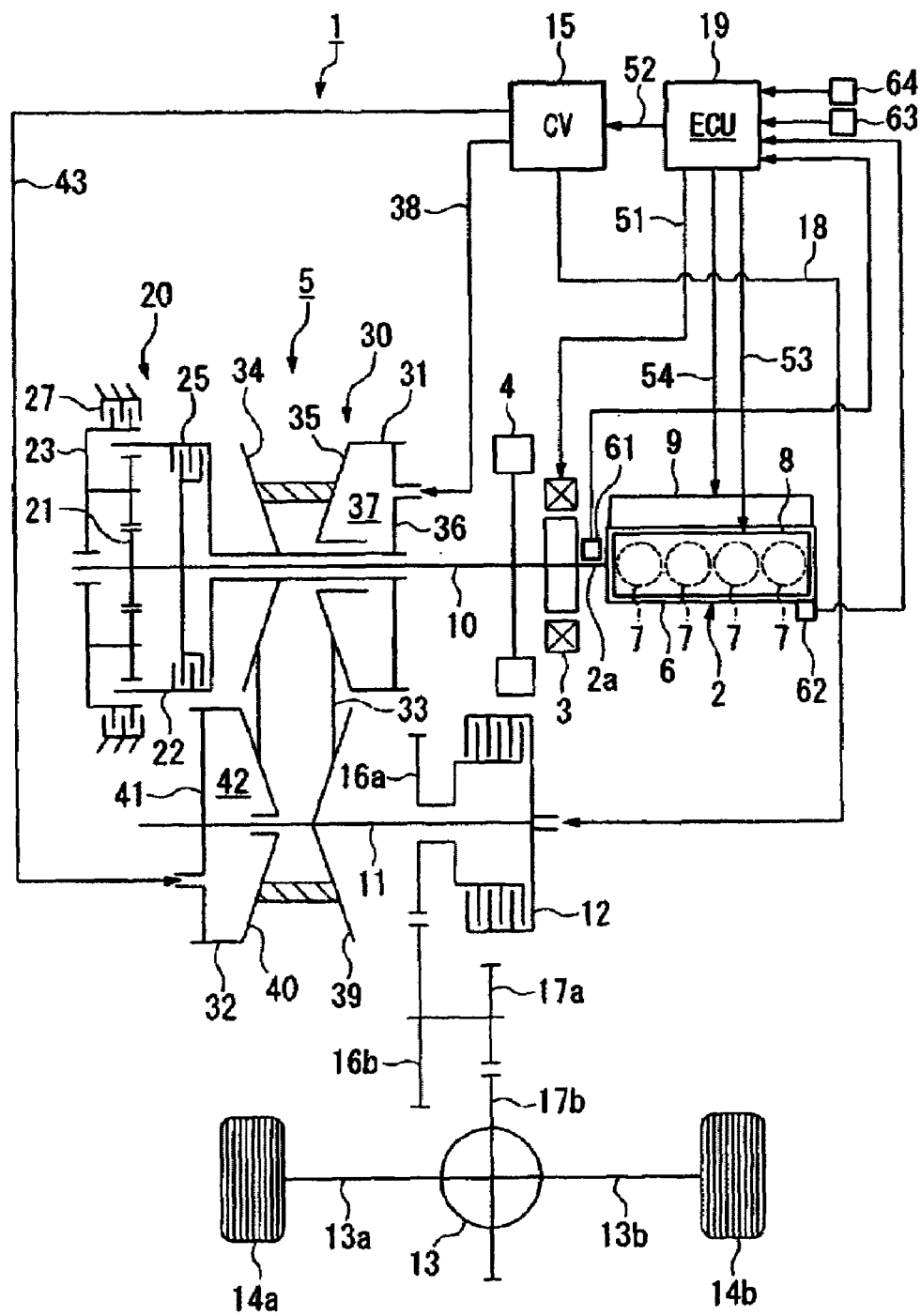
FIG. 1 is a diagram showing the general structure of a driving power transmission system in an embodiment of a hybrid vehicle according to the present invention.

FIG. 1 is a diagram showing the general structure of the driving power transmission system in an embodiment of the hybrid vehicle according to the present invention. The driving power transmission system of the hybrid vehicle 1 comprises an engine 2, motor 3 (hereinafter referred to as a motor-generator) which is capable of generating electrical power, and which is disposed on an output shaft 2a of the engine 2, and a pulley and belt type continuously variable transmission (CVT) 5 connected to the engine output shaft 2a via a coupling mechanism 4.

The engine 2 is a four-cylinder reciprocating engine in which pistons are respectively provided in four cylinders 7 formed in an engine block 6. The engine 2 comprises an intake-exhaust control device 8 which controllably operates intake valves and exhaust valves for executing drawing and discharging operations of the cylinders 7, and a fuel injection and ignition control device 9 which controls fuel injection and ignition of injected fuel for each of the cylinders 7.

As explained above, the motor-generator 3 is directly connected to the engine 2 so that at least one of the driving powers of the engine 2 and the motor-generator 3 is transmitted to driving wheels 14a and 14b via the continuously variable transmission 5. The motor-generator 3 is operated by a battery (not shown) installed on the vehicle so as to enable the vehicle to travel in a motor cruise mode, while on the other hand, the motor-generator 3 can generate power by being driven by the driving wheels 14a and 14b so as to charge the battery (a regenerative operation) during a deceleration traveling of the vehicle. In such a manner, the above driving power transmission system comprises power sources generally known as a hybrid type.

The continuously variable transmission 5 comprises a metallic V-belt mechanism 30 provided on an input shaft 10 and a counter shaft 11, a forward-reverse switching mechanism 20 provided on the input shaft 10, and a starting clutch (a clutch section) 12 provided on the counter shaft 11. The input shaft 10 is connected to the engine output shaft 2a via the coupling mechanism 4. The driving power from the starting clutch 12 is transmitted to the right and left driving wheels 14a and 14b via a differential mechanism 13 and right and left axle shafts (output shafts) 13a and 13b.

The metallic V-belt mechanism 30 comprises a drive side movable pulley 31 provided on the input shaft 10, a driven side movable pulley 32 provided on the counter shaft 11, and a metallic V-belt 33 wound around the pulleys 31 and 32. The drive side movable pulley 31 comprises a fixed pulley half 34 provided on the input shaft 10 in a rotatable manner, and a movable pulley half 35 which is made movable in an axial direction with respect to the fixed pulley half 34. There is provided a drive side cylinder chamber 37, which is delimited by a cylinder wall 36, in the right of the movable pulley half 35 in FIG. 1. A drive side lateral pressure for making the movable pulley half 35 move in the axial direction is produced by providing a pulley controlling oil pressure in the drive side cylinder chamber 37 from a control valve 15 via an oil passage 38.

The driven side movable pulley 32 comprises a fixed pulley half 39 provided on the counter shaft 11, and a movable pulley half 40 which is made movable in an axial direction with respect to the fixed pulley half 39. There is provided a driven side cylinder chamber 42, which is delimited by a cylinder wall 41, in the left of the movable pulley half 40 in FIG. 1. A driven side lateral pressure for making the movable pulley half 40 move in the axial direction is produced by providing a pulley controlling oil pressure in the driven side cylinder chamber 42 from a control valve 15 via an oil passage 43.

The oil pressures (the drive side lateral pressure and driven side lateral pressure) provided to the cylinders 37 and 42 are controlled by the control valve 15 so that lateral pressures sufficient to prevent slip of the metallic V-belt 33 are provided. A further control is selectively executed so that the drive side lateral pressure and driven side lateral pressure differ from each other, whereby groove widths of the pulleys 31 and 32 are changed so as to change wound radiuses of the metallic V-belt 33 in order to change transmission speed ratio in a stepless manner.

The forward-reverse switching mechanism 20, which is formed by a planetary gear mechanism, comprises a sun gear 21 connected to the input shaft 10, a ring gear 22 connected to the fixed pulley half 34 of the drive side movable pulley 31, a carrier 23 which is adapted to be selectively fixed by a reversing brake 27, and a forward clutch 25 which is adapted to selectively connect the sun gear 21 to the ring gear 22. In the forward-reverse switching mechanism 20, when the forward clutch 25 is engaged, all gears 21, 22, and 22 rotate with the input shaft 10, and the drive side movable pulley 31 is rotated by the engine 2 or the motor-generator 3 in a direction which is the same as that of the input shaft 10 (i.e., in the forward direction). On the other hand, when the reversing brake 27 is engaged, because the carrier 23 is fixed, the ring gear 22 is driven in a direction opposite to that of the sun gear 21, and the drive side movable pulley 31 is rotated in a direction opposite to that of the input shaft 10 (i.e., in the reverse direction). The engagement operations of the forward clutch 25 and reversing brake 27 are controlled by a forward-reverse control oil pressure which is set in the control valve 15 using a line pressure.

The starting clutch 12 is a clutch controlling power transmission from the counter shaft 11 to output elements, i.e., to power transmission gears 16a, 16b, 17a, and 17b. Driving power is transmitted to the output elements when the starting clutch 12 is engaged. Accordingly, when the starting clutch 12 is engaged, the output power of the engine 2 or motor 3, while driving speed is changed through the metallic V-belt mechanism 30, is transmitted to the differential mechanism 13 via the power transmission gears 16a, 16b, 17a, and 17b, and then the driving power is split by the differential mechanism 13, and the split driving powers are transmitted to the driving wheels 14a and 14b via the right and left axle shafts 13a and 13b. When the starting clutch 12 is disengaged, power transmission is not performed, and the transmission 5 is placed in a neutral state. The engagement control of the starting clutch 12 is executed by a clutch control oil pressure which is set in the control valve 15 using a line pressure, and which is supplied via an oil passage 18.

In the continuously variable transmission 5 configured as explained above, a speed change control is executed by the drive and driven sides lateral pressures produced by using oil pressure provided by the control valve 15 via the oil passages 38 and 43, a forward-reverse switching control is executed by the forward-reverse control oil pressure supplied to the forward clutch 25 and the reversing brake 27 via oil passages (not shown), and a starting clutch engagement control is executed by the clutch control oil pressure supplied via the oil passage 18. The operation of the control valve 15 is controlled by control signals provided from an electrical control unit (hereinafter abbreviated as an ECU) 19.

In the engine 2, an all-cylinder deactivation operation can be executed, in which all four cylinders are deactivated in a predetermined operation state (e.g., a deceleration operation, or motor cruise operation which will be explained below). In other words, the ECU 19 controls the operation of the intake-exhaust control device 8 via a control line 53, and controls the operation of the fuel injection and ignition control device 9 via a control line 54 so as to close the intake and exhaust valves of all cylinders 7, and so as to stop fuel injection and ignition, and thus an all cylinder deactivation operation can be executed. By executing the all cylinder deactivation operation, fuel efficiency during a deceleration operation can be improved, the friction of the engine 2 can be reduced, and the kinetic energy of the vehicle during a deceleration operation can be effectively recovered by the regenerative operation of the motor-generator 3.

The mechanism (cylinder deactivation mechanism) with which the intake and exhaust valves are maintained in a closed state is not limited to a specific one, and a mechanism in which the operations of the valves are stopped by using a hydraulic control, or a mechanism in which the intake and exhaust valves consist of electromagnetic valves whose operations are selectively stopped, may be employed.

To the ECU 19, a revolution sensor 61 which measures the revolution rate of the engine output shaft 2a, an intake pressure sensor 62 which measures the intake negative pressure of the engine 2, a throttle opening degree sensor 63 which measures the throttle opening degree of the engine 2, a vehicle speed sensor 64 which measures the traveling speed of the hybrid vehicle 1, are electrically connected so that output signals corresponding to measured values measured by the sensors 61 to 62 are input into the ECU 19.

In the hybrid vehicle 1 comprising the power transmission system configured as described above, in order to improve fuel efficiency during a cruise operation, two cruise modes are provided, i.e., (1) a motor cruise mode (in which the vehicle is driven by the motor-generator), and (2) an engine cruise mode (in which the vehicle is driven by the engine).

More specifically, the motor cruise mode, in which the vehicle is driven solely by the motor-generator 3, is selected when the vehicle travels under low load conditions, which may degrade fuel efficiency, and the engine cruise mode, in which the vehicle is driven solely by the engine 2, is selected when the engine 2 can be operated while obtaining preferable fuel efficiency.

In the motor cruise mode, a control operation is executed in which fuel supply to all of the cylinders of the engine 2 is stopped, and all of the cylinders are deactivated, i.e., the intake and exhaust valves of all of the cylinders are maintained in a closed state so that pumping loss is reduced, and in addition, a motor output control is executed in which the motor-generator 3 generates electrical power which corresponds to pumping loss and friction of the engine 2 and to kinetic energy of the vehicle. On the other hand, in the engine cruise mode, the motor-generator 3 does not output driving power. The operation of the motor-generator 3 is controlled by the control signals provided by the ECU 19 via a control line 51.

In addition, in the engine cruise mode, a gear ratio selecting control is also executed so that an optimum gear ratio is selected in order to operate the engine 2 under conditions for obtaining better fuel efficiency. Such a control is performed by the control signals sent from the ECU 19 to the control valve 15 via a control line 52.

As mentioned above, if the driving mode of the vehicle is switched from the engine cruise mode to the motor cruise mode immediately, or from the motor cruise mode to the engine cruise mode immediately, a drag feeling or jolt is experienced due to stop or restart of the engine operation, or stop or restart of the operations of the intake and exhaust valves; therefore, in the hybrid vehicle 1 of the present embodiment, the output power of the motor-generator 3 and the engagement degree of the starting clutch 12 are controlled so as to improve drivability and to stabilize vehicle behavior when the driving mode is switched.

Switching Operation from Engine Cruise Mode to Motor Cruise Mode

A switching operation from the engine cruise mode to the motor cruise mode will be explained below with reference to the timing chart shown in FIG. 2.

Figure 2:
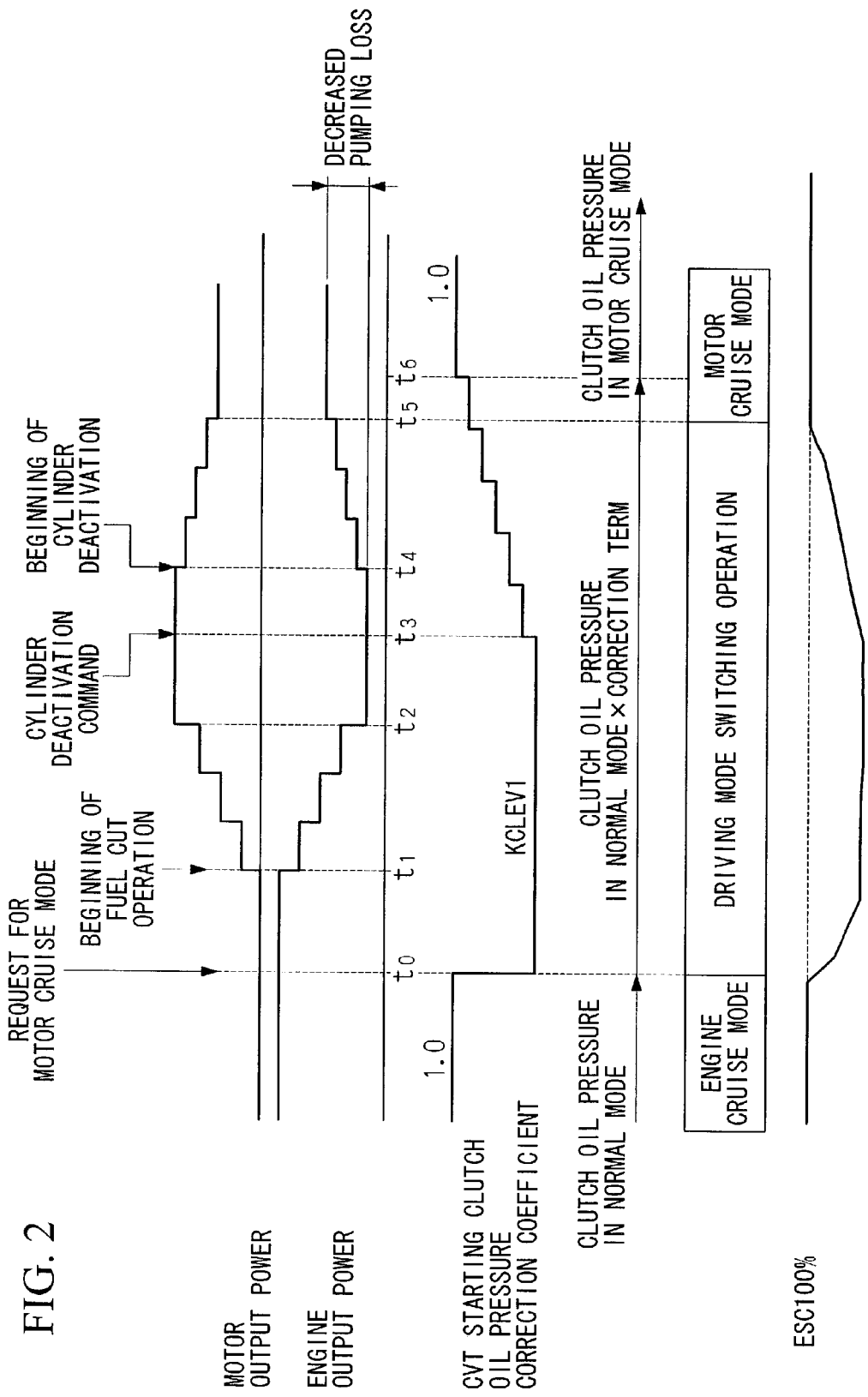
FIG. 2 is a timing chart showing a state of the above embodiment in which the driving mode of the vehicle is switched from an engine cruise mode to a motor cruise mode.

In FIG. 2, the vehicle travels in the engine cruise mode before time t0, and a mode switching operation from the engine cruise mode to the motor cruise mode begins (a request for the motor cruise mode is made) at time t0.

In the engine cruise mode, the engine 2 runs in an all-cylinder activation mode, and the motor-generator 3 outputs no power. The starting clutch 12 is in an engaged state in which a starting clutch oil pressure correction coefficient is set to be 1.0 (i.e., correction is not enforced), which means that the oil pressure for the starting clutch 12 is set to be a desired oil pressure for the starting clutch during engine cruise mode (hereinafter, this oil pressure is referred to as a clutch oil pressure in normal mode).

Upon receiving a request for the motor cruise mode, the desired oil pressure for the starting clutch is decreased so as to once decrease the engagement degree of starting clutch 12. In this case, the desired oil pressure for the starting clutch is obtained by multiplying the clutch oil pressure in normal mode by the starting clutch oil pressure correction coefficient. By once decreasing the engagement degree of starting clutch 12 in such a manner, a drag feeling due to a consequent fuel cut operation can be reduced, and as a result, vehicle behavior is stabilized, and drivability is improved.

Upon receiving a request for the motor cruise mode, the fuel cut operation begins at time t1, and fuel supply to the cylinders and ignitions therein are stopped from one cylinder to the next. As a result, the output power of the engine is decreased stepwise. At this stage, open and close operations of the intake and exhaust valves of all of the cylinders are still executed, whereby unburned fuel is completely expelled. In synchronism with decrease in output power of the engine 2, i.e., in synchronism with combustion timing of the engine 2, the motor-generator 3 is controlled so as to output driving power, whereby the source of the driving power is switched from the engine 2 to the motor-generator 3 stepwise. In this case, the motor-generator 3 is controlled so as to output an amount of driving power corresponding not only to the driving power produced by the cylinders to which fuel supply has stopped, but also to the friction (including pumping loss) of the same cylinders. In other words, the motor-generator 3 is controlled so as to output power including power for compensating for the engine friction, which is manifested by fuel cutting, in addition to the driving power necessary for driving the vehicle by the motor-generator 3. The fuel cut operations for all of the cylinders are completed at time t2.

By controlling the motor-generator 3 in such a manner, the driving source is smoothly switched from the engine 2 to the motor-generator 3 without having variation in the driving power, and thus a drag feeling due to the fuel cut operation can be reduced, vehicle behavior is stabilized, and drivability can be improved.

Then, at time t3, an all-cylinder deactivation command is provided to the engine 2, and at the same time, the desired oil pressure for the starting clutch, which was once decreased, is gradually increased so as to gradually increase the engagement degree of starting clutch 12. In this case, the desired oil pressure for the starting clutch is obtained by multiplying the clutch oil pressure in normal mode by the starting clutch oil pressure correction coefficient, and the starting clutch oil pressure correction coefficient is gradually increased.

Upon receiving the all-cylinder deactivation command, the cylinder deactivation operation begins at time t4, and the intake and exhaust valves are made to be closed from one cylinder to the next. As a result, because pumping loss of the engine 2 is decreased stepwise, the motor-generator 3 is controlled so that the output power thereof is decreased stepwise by an amount corresponding to the reduced pumping loss per cylinder. At time t5, the intake and exhaust valves of all of the cylinders are completely closed, which means that an all-cylinder deactivation operation is completed, whereby switching from the motor cruise mode to the engine cruise mode is completed.

Then, at time t6, correction of the desired oil pressure for the starting clutch is finished, i.e., the starting clutch oil pressure correction coefficient is made to be 1.0, and the desired oil pressure for the starting clutch is set to be a desired oil pressure for the starting clutch in motor cruise mode (hereinafter, this desired oil pressure is referred to as a clutch oil pressure in motor cruise mode).

By controlling the output power of the motor-generator 3 in such a manner, changes in the engine friction due to stop of the intake and exhaust valves can be compensated by the change in the output power of the motor-generator 3; therefore, a vehicle jolt can be prevented, and drivability may be improved.

Moreover, because the desired oil pressure for the starting clutch is gradually increased so that the engagement degree of starting clutch 12 is gradually recovered by when the cylinder deactivation for all cylinders is completed, a vehicle jolt due to engagement of the starting clutch 12 can be avoided.

Switching Operation from Motor Cruise Mode to Engine Cruise Mode

Next, a switching operation from the motor cruise mode to the engine cruise mode will be explained below with reference to the timing chart shown in FIG. 3.

Figure 3:
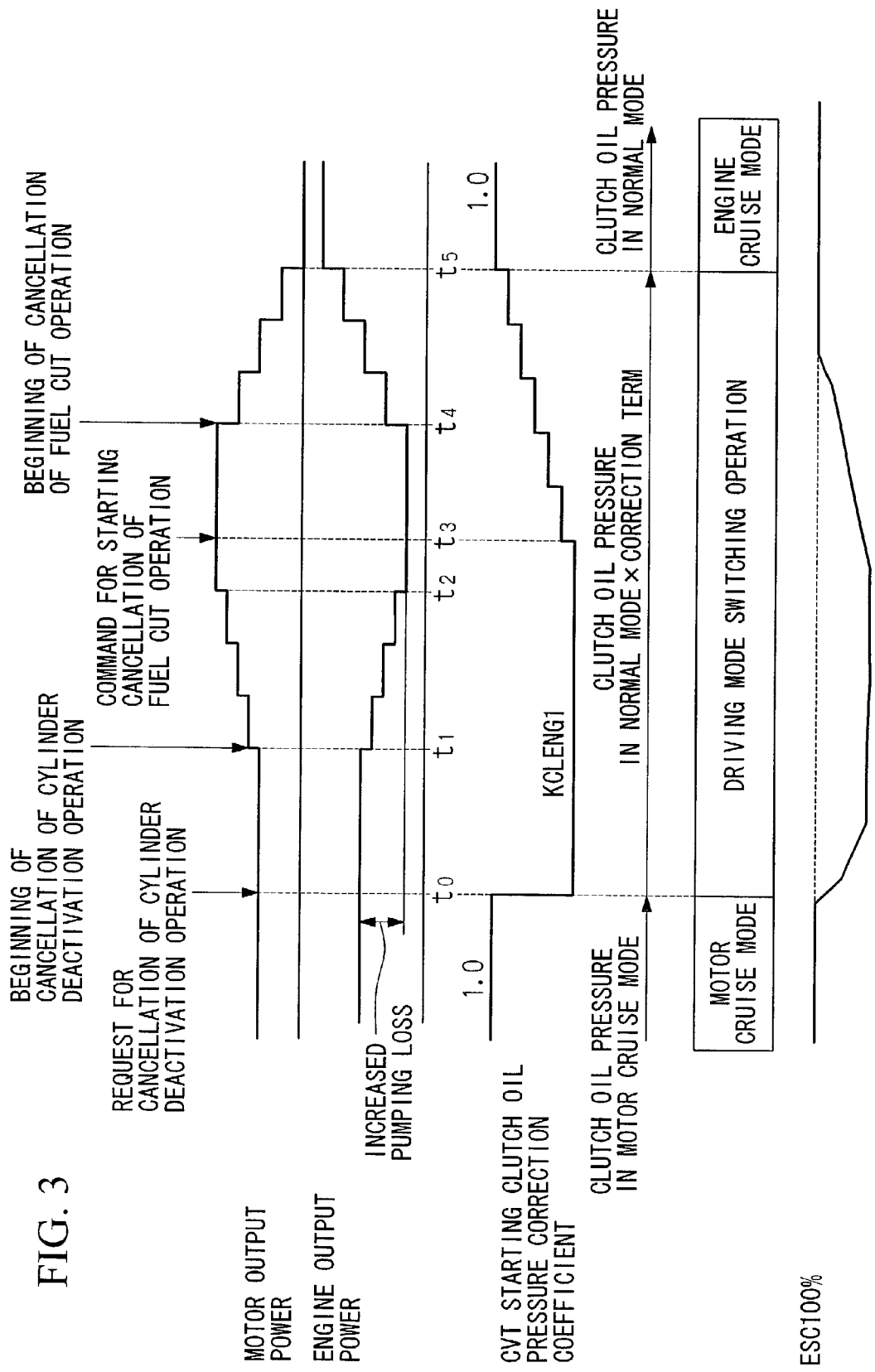
FIG. 3 is a timing chart showing a state of the above embodiment in which the driving mode of the vehicle is switched from the motor cruise mode to the engine cruise mode.

In FIG. 3, the vehicle travels in the motor cruise mode before time t0, and a mode switching operation from the motor cruise mode to the engine cruise mode begins (a request for cancellation of the cylinder deactivation operation is made) at time t0.

Upon the request for cancellation of the cylinder deactivation operation, the desired oil pressure for the starting clutch is decreased so as to once decrease the engagement degree of starting clutch 12. In this case, the desired oil pressure for the starting clutch is obtained by multiplying the clutch oil pressure in normal mode by the starting clutch oil pressure correction coefficient.

Based on the request for cancellation of the cylinder deactivation operation, cancellation of the cylinder deactivation operation of the engine 2 begins at time t1, and the operations of the intake and exhaust valves are resumed from one cylinder to the next. At this stage, fuel supply to all of the cylinders and ignitions therein are maintained to be stopped. As a result, because pumping loss of the engine 2 is increased stepwise, the motor-generator 3 is controlled so that the output power thereof is increased stepwise by an amount corresponding to the increasing pumping loss per cylinder. At time t2, the operations of the intake and exhaust valves of all of the cylinders are completely resumed.

By controlling the output power of the motor-generator 3 in such a manner, increase in the pumping loss due to resuming of the operations of the intake and exhaust valves can be compensated by the change in the output power of the motor-generator 3; therefore, a drag feeling can be reduced, and drivability may be improved.

Then, at time t3, a command for starting cancellation of the fuel cut operation is provided to the engine 2, at the same time, the desired oil pressure for the starting clutch, which was once decreased, is gradually increased so as to gradually increase the engagement degree of starting clutch 12. In this case, the desired oil pressure for the starting clutch is obtained by multiplying the clutch oil pressure in normal mode by the starting clutch oil pressure correction coefficient, and the starting clutch oil pressure correction coefficient is gradually increased.

Upon receiving the command for starting cancellation of the fuel cut operation, the fuel supply and ignition are resumed at time t1, and are executed from one cylinder to the next. As a result, the output power of the engine is increased stepwise. In synchronism with increase in output power of the engine 2, i.e., in synchronism with combustion timing of the engine 2, the motor-generator 3 is controlled so as to output driving power, whereby the source of the driving power is switched from the motor-generator 3 to the engine 2 stepwise. In this case, the motor-generator 3 is controlled so that the output power of the motor-generator 3 is decreased by an amount of driving power corresponding not only to the driving power produced by the cylinders to which fuel supply has resumed, but also to the friction (including pumping loss) of the same cylinders. At time t5, the fuel supply to all of the cylinders is completely resumed, and the switching operation from the motor cruise mode to the engine cruise mode is completed.

In addition, at time t5, the correction of the desired oil pressure for the starting clutch is finished, i.e., the starting clutch oil pressure correction coefficient is set to be 1.0, and the desired oil pressure for the starting clutch is set to be the clutch oil pressure in normal mode.

By controlling the motor-generator 3 in such a manner, the driving source is smoothly switched from the motor-generator 3 to the engine 2 without having variation in the driving power. At the same time, because the correction of the desired oil pressure for the starting clutch is executed so as to decrease the engagement degree of starting clutch 12, a combustion initiation jolt due to start of the engine operation can be reduced, vehicle behavior is stabilized, and drivability can be improved.

Furthermore, because the desired oil pressure for the starting clutch is gradually increased so as to increase the engagement degree of starting clutch 12 by when the fuel supply to all of the cylinders is completely resumed, a vehicle jolt due to engagement of the starting clutch 12 can be avoided.

In FIGS. 2 and 3, the ESC (%) indicates revolution ratio between the input side and the output side of the starting clutch 12, and when the ESC is 100%, there is no slip therebetween, i.e., the starting clutch 12 is in a completely engaged state.

Next, the driving mode switching operation will be more specifically explained with reference to the flowcharts shown in FIGS. 4 to 18.

Motor Cruise Mode Main Routine

The main control routine of the motor cruise mode will be explained with reference to the flowchart shown in FIG. 4.

Figure 4:
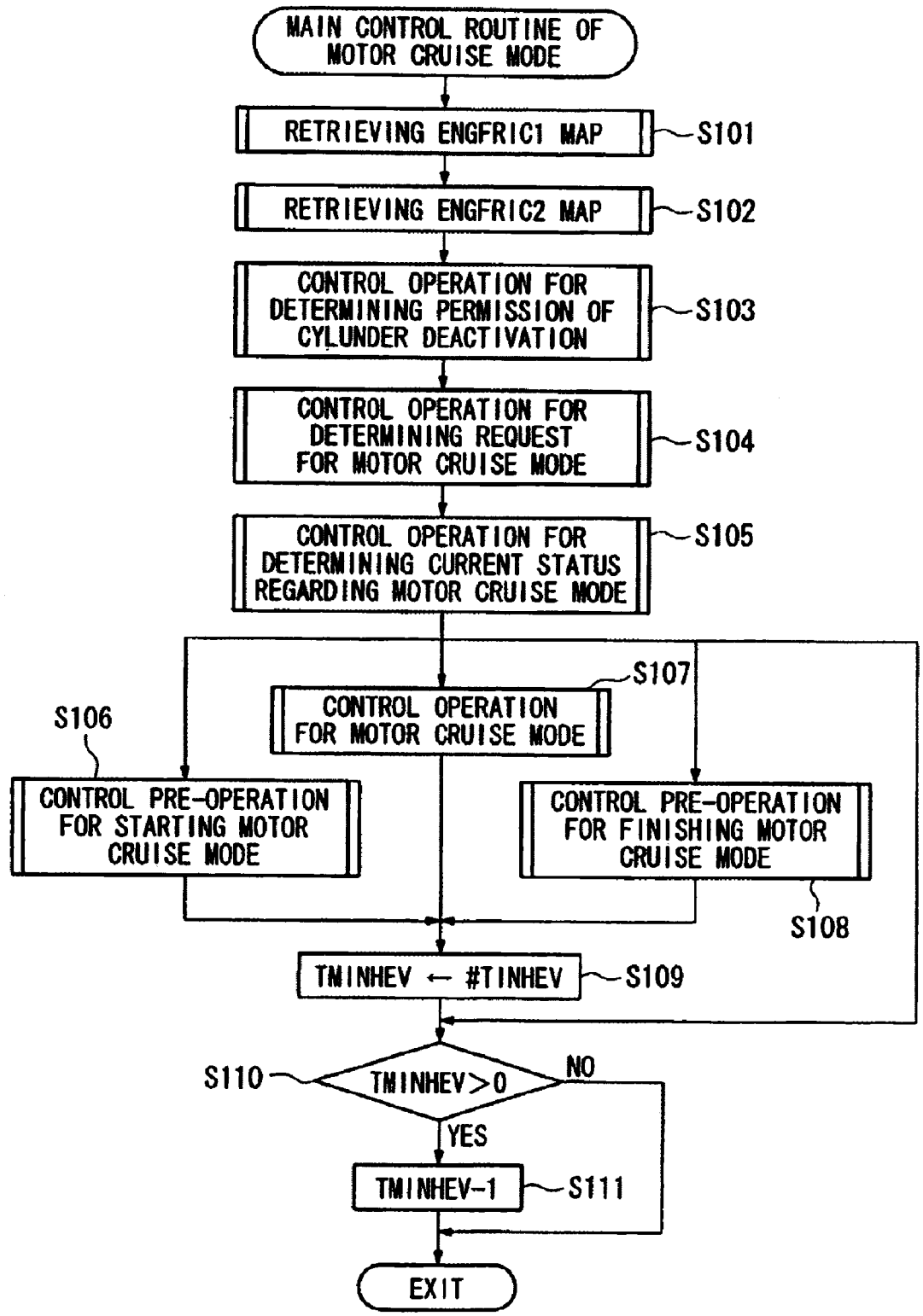
FIG. 4 is a flowchart showing a main routine for executing an operation of a motor cruise mode for the hybrid vehicle of the above embodiment.

The flowchart shown in FIG. 4 shows the main control routine of the motor cruise mode, which is repeatedly and periodically executed by the ECU 19.

Figure 5:
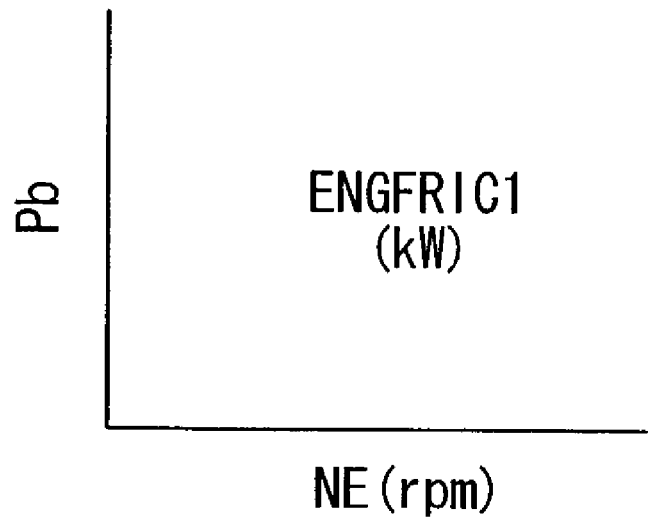
FIG. 5 is a graph drawn based on a map that defines engine friction values in the hybrid vehicle of the above embodiment in an all-cylinder operation state.

In step S101, an engine friction ENGFRIC1, which is the friction of the engine 2 in an all-cylinder operation state, is retrieved from an ENGFRIC1 map or table shown in FIG. 5 depending on an engine revolution rate and an intake negative pressure.

Figure 6:
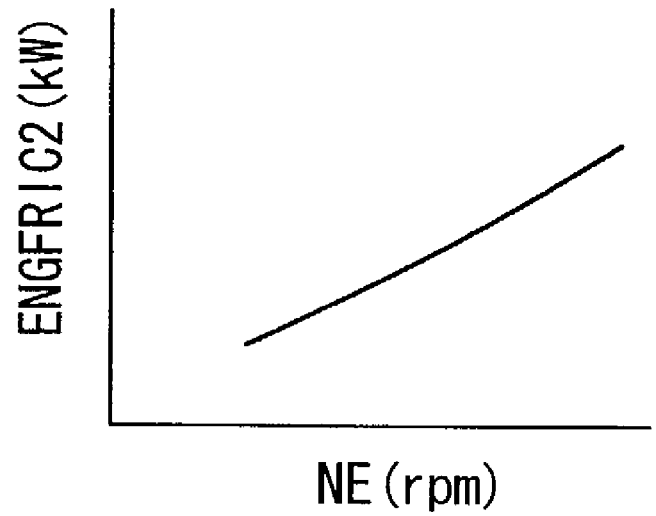
FIG. 6 is a graph drawn based on a map that defines engine friction values in the hybrid vehicle of the above embodiment in an all-cylinder deactivation state.

Then, the control operation proceeds to step S102, in which an engine friction ENGFRIC2, which is the friction of the engine 2 in an all-cylinder deactivation state, is retrieved from an ENGFRIC2 map or table, represented by FIG. 6, depending on the engine revolution rate.

Next, the operation proceeds to step S103, in which a control operation for determining permission of cylinder deactivation is executed in order to determine whether or not the engine 2 may be placed in the all-cylinder deactivation state.

Then, the operation proceeds to step S104, in which the control operation for determination of permission for the motor cruise mode is executed for determining whether or nor the motor cruise mode is permitted. In this embodiment, executing the control operation for determination of permission for the motor cruise mode in step S104 corresponds to a driving mode determining section. The control operation for determination of permission for the motor cruise mode will be explained below in detail.

Next, the operation proceeds to step S104, in which a control operation for determining current status regarding the motor cruise mode is executed for determining current status regarding the motor cruise mode. More specifically, in this operation, it is determined whether or not the vehicle is in the motor cruise mode, whether the vehicle is entering into the motor cruise mode, or whether the driving mode is being switched. When it is determined, in step S105, that the vehicle is entering into the motor cruise mode, the operation proceeds to step S106 in which a control pre-operation for starting the motor cruise mode is executed, when it is determined that the vehicle is in the motor cruise mode, the operation proceeds to step S107 in which a control operation for the motor cruise mode is executed, and when it is determined that the driving mode is being switched to the engine cruise mode, the operation proceeds to step S108 in which a control pre-operation for finishing the motor cruise mode is executed, and when it is determined that the vehicle is not in the motor cruise mode, i.e., the vehicle is not in the engine cruise mode, the operation proceeds to step S110. The control pre-operation for starting the motor cruise mode and the control pre-operation for finishing the motor cruise mode will be explained below in detail.

After executing the control pre-operation for starting the motor cruise mode in step S106, or after executing the control operation for the motor cruise mode in step S107, or after executing the control pre-operation for finishing the motor cruise mode in step S108, the operation proceeds to step S109, in which an initial value #TINHEV is set into a busy prevention timer TMINHEV.

Then, the operation proceeds to step S110, in which it is determined whether the counter value of the busy prevention timer TMINHEV is equal to or greater than "0". When the result of the determination is "YES", i.e., TMINHEV>0, the operation proceeds to step S111, in which "1" is subtracted from the counter value of the busy prevention timer TMIN-HEV, and then the control operation in this routine is once terminated. In contrast, when the result of the determination is "NO", i.e., TMINHEV≦0, the control operation in this routine is terminated without executing the control operation in step S111.

More specifically, when the operation proceeds to the control pre-operation for starting the motor cruise mode, to the control operation for the motor cruise mode, or to the control pre-operation for finishing the motor cruise mode by the determination in step S105, the counter value of busy prevention timer TMINHEV is maintained to be the initial value #TINHEV; however, in contrast, when it is determined, in the control operation for determining current status regarding the motor cruise mode in step S105, that the vehicle is not in the motor cruise mode, "1" is subtracted from the counter value of the busy prevention timer TMIN-HEV every time this control routine is executed.

Control Operation for Determination of Request for the Motor Cruise Mode

Figure 7:
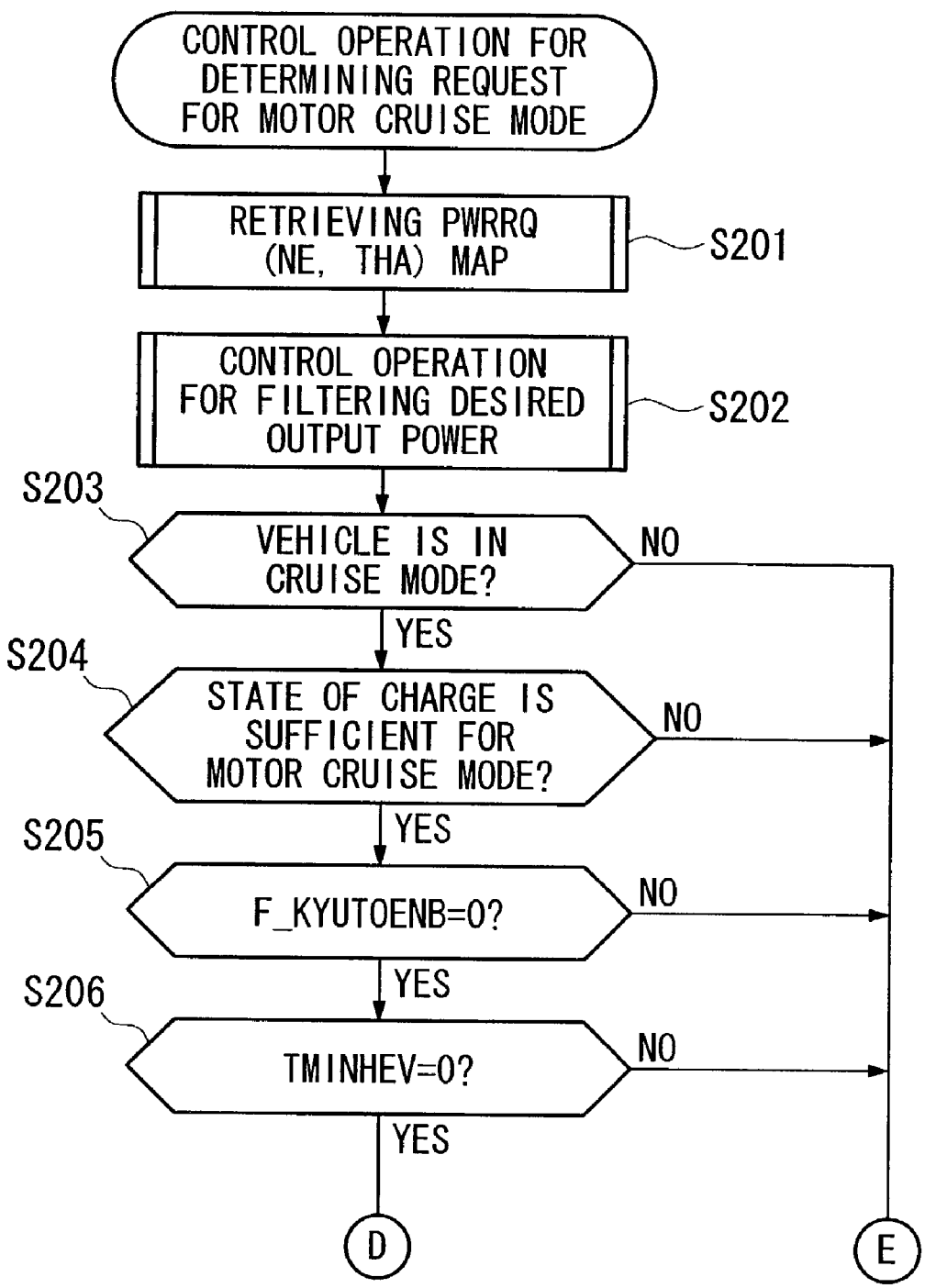
FIG. 7 is a flowchart (part 1) showing a control operation for determination of request for the motor cruise mode for the hybrid vehicle of the above embodiment.
Figure 8:
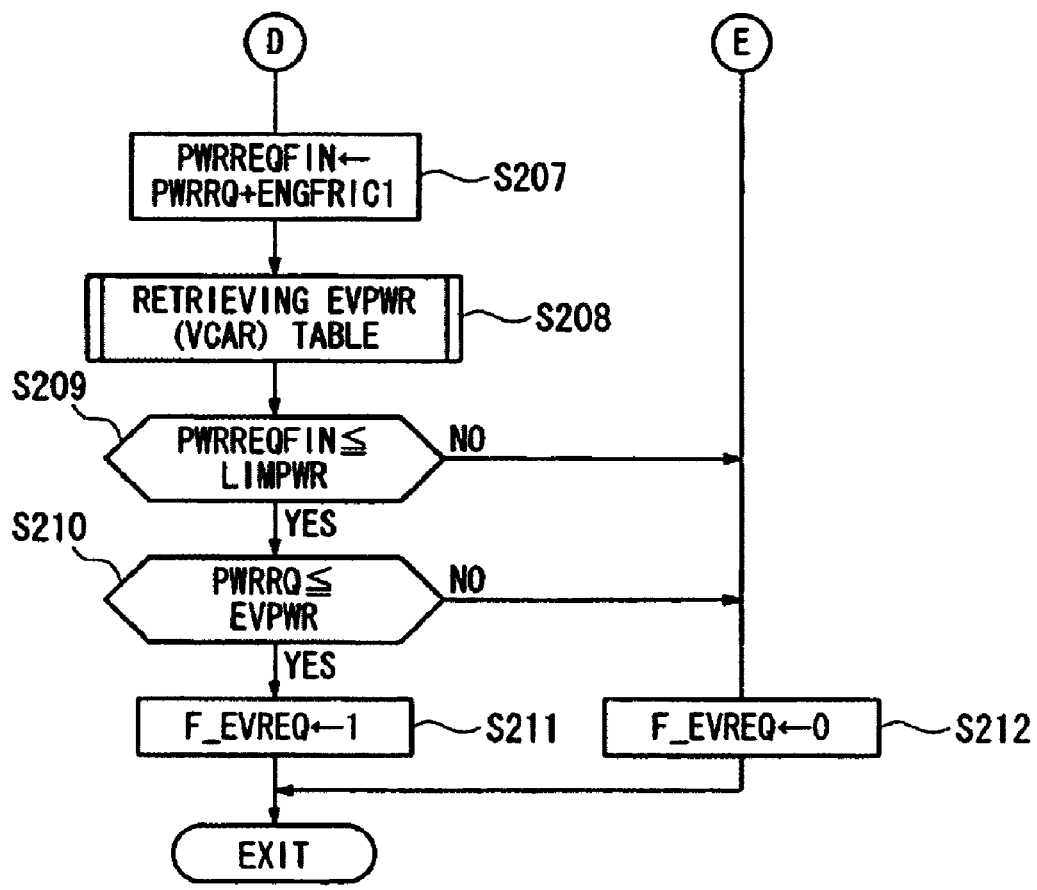
FIG. 8 is a flowchart (part 2) showing the control operation for determination of request for the motor cruise mode for the hybrid vehicle of the above embodiment.

Next, the control operation for determination of request for the motor cruise mode in step S104 will be explained with reference to the flowcharts shown in FIGS. 7 and 8.

Figure 9:
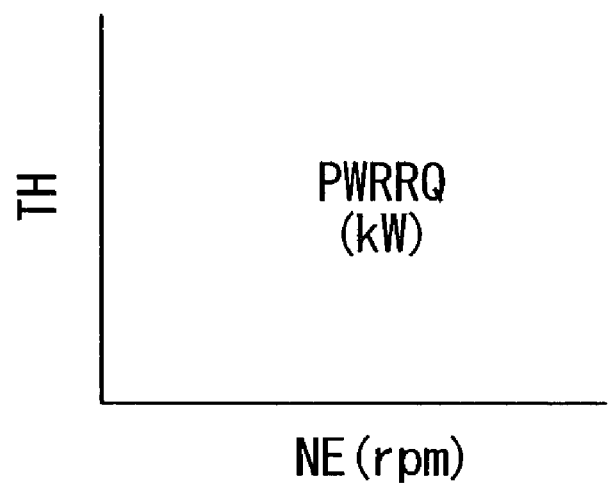
FIG. 9 is a map defining a desired output power for the hybrid vehicle of the above embodiment.

In step S201, a desired output power of the vehicle (hereinafter simply referred to as a desired output power) PWRRQ, which is the output power needed for driving the vehicle, is retrieved from the desired output power map or table shown in FIG. 9 depending on the engine revolution rate and an opening degree of throttle.

Next, the operation proceeds to step S202, in which the control operation for filtering the desired output power is executed. More specifically, a maximum range of changes in the desired output power has been set in advance, the difference between the current desired output power PWRRQ determined in step S201 in the present routine and the previous desired output power PWRRQ determined in step S201 in the immediately previous routine are calculated, and when the difference is greater than the maximum range for changes in the desired output power, the desired output power PWRRQ is limited to the limit value of the range.

By limiting the range of changes in the desired output power in such a manner, a frequent switching of the driving mode between the engine cruise mode and the motor cruise mode, i.e., a hunting phenomenon, is prevented, so that drivability is improved, while on the other hand, increase in fuel consumption of the engine 2 associated with switching of the driving mode and increase in power of the motor-generator 3 are minimized.

In this embodiment, executing the control operation in step S202 corresponds to a filter limiting the range of changes in the desired output power.

Next, the operation proceeds to step S203, in which it is determined whether the vehicle is in a cruise mode. When the result of the determination is "YES", the operation proceeds to step S204, and when the result of the determination is "NO", which means that the motor cruise mode is not permitted, the operation proceeds to step S212.

In step S204, it is determined whether the state of charge of the battery is sufficient for the motor cruise mode. When the result of the determination is "YES", i.e., the state of charge of the battery is sufficient for the motor cruise mode, the operation proceeds to step S205, and when the result of the determination is "NO", i.e., the state of charge of the battery is not sufficient for the motor cruise mode, the operation proceeds to step S212.

In step S205, it is determined whether the value of a cylinder deactivation permission flag F_KYUTOENB is "0". The cylinder deactivation permission flag F_KYUTOENB is set to be "0" when the cylinder deactivation operation is permitted, and is set to be "1" when the cylinder deactivation operation is not permitted. When the result of the determination in step S205 is "YES", i.e., F_KYUTOENB=0, the operation proceeds to step S206, and when the result of the determination is "NO", i.e., F_KYUTOENB=1, the operation proceeds to step S212.

In step S206, it is determined whether the counter value of the busy prevention timer TMINHEV is equal to "0". When the result of the determination is "YES", the operation proceeds to step S207, and when the result of the determination is "NO", the operation proceeds to step S212. When the result of the determination in step S206 is not "YES", i.e., TMINHEV≠0, a motor cruise mode request flag F_EVREQ is not set to "1" in step S211, i.e., the motor cruise mode is not requested, which will be explained below. This control means that the motor cruise mode is not permitted unless the engine cruise mode has been maintained for a predetermined time period when the driving mode is switched from the engine cruise mode to the motor cruise mode, whereby a frequent switching of the driving mode between the engine cruise mode and the motor cruise mode, i.e., a hunting phenomenon, is prevented so that drivability is improved, while on the other hand, increase in fuel consumption of the engine 2 associated with switching of the driving mode and increase in power of the motor-generator 3 are minimized.

In step S207, a PWRREQFIN is calculated. The PWRREQFIN is calculated by adding the engine friction ENGFRIC1 determined in step S101 to the desired output power PWRRQ after filtering in step S202.

$$PWRREQFIN=PWRRQ+ENGFRIC1$$

Figure 10:
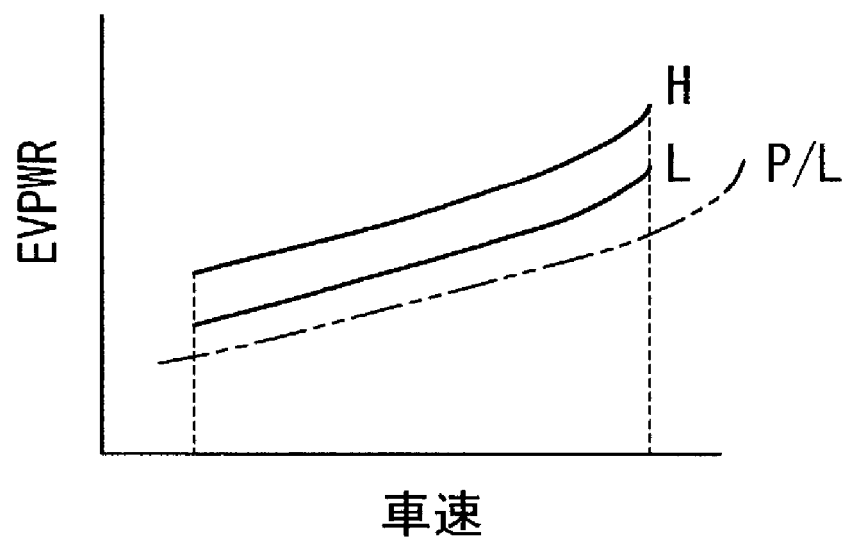
FIG. 10 is a graph drawn based on a map that defines a required output power for the motor cruise mode in the hybrid vehicle of the above embodiment in an all-cylinder deactivation state.

Next, the operation proceeds to step S208, in which a required output power for the motor cruise mode EVPWR is retrieved from a map or table of required output power for the motor cruise mode, represented by FIG. 10, depending on the current vehicle speed. The required output power for the motor cruise mode EVPWR is the output power of the motor needed for the motor cruise mode which is set depending on the vehicle speed. In FIG. 10, the two-dot chain line indicates road load, i.e., the minimum motor power needed for cruise, the EVPWR is set to be greater than the road load, and there is provided a hysteresis for preventing a hunting phenomenon. Next, the operation proceeds to step S209, in which it is determined whether the PWRREQFIN calculated in step S207 is equal to or less than a maximum motor output power LIMPWR. The maximum motor output power LIMPWR is the power of the motor-generator 3 obtainable with the current state of charge of the battery 9. More specifically, in step S209, it is determined whether or not the motor output power, which is needed for driving when the engine 2 is placed in the all-cylinder deactivation state (i.e., the motor output power needed time t2 to time t4 in FIG. 2), is obtainable with the current state of charge of the battery 9. When the result of the determination in step S209 is "YES", i.e., PWRREQFIN≦LIMPWR, the operation proceeds to step S210, and when the result of the determination is "NO", i.e., PWRREQFIN>LIMPWR, which means that switching to the motor cruise is not possible, and then the operation proceeds to step S212.

In step S210, it is determined whether the desired output power PWRRQ after filtering in step S202 is equal to or less than the motor cruise mode EVPWR determined in step S208.

When the result of the determination in step S210 is "YES", i.e., PWRRQ≦EVPWR, the operation proceeds to step S211, in which the motor cruise mode request flag F_EVREQ is set to be "1" because the motor cruise mode is requested, and then the control operation in this routine is once terminated.

In contrast, when the result of the determination in step S210 is "NO", i.e., PWRRQ>EVPWR, which means that the motor cruise mode is not possible, the operation proceeds to step S212.

In step S212, it is deemed that the motor cruise mode is not requested, and the motor cruise mode request flag F_EVREQ is set to be "0", and then the control operation in this routine is once terminated.

Control Pre-Operation for Starting the Motor Cruise Mode

Figure 11:
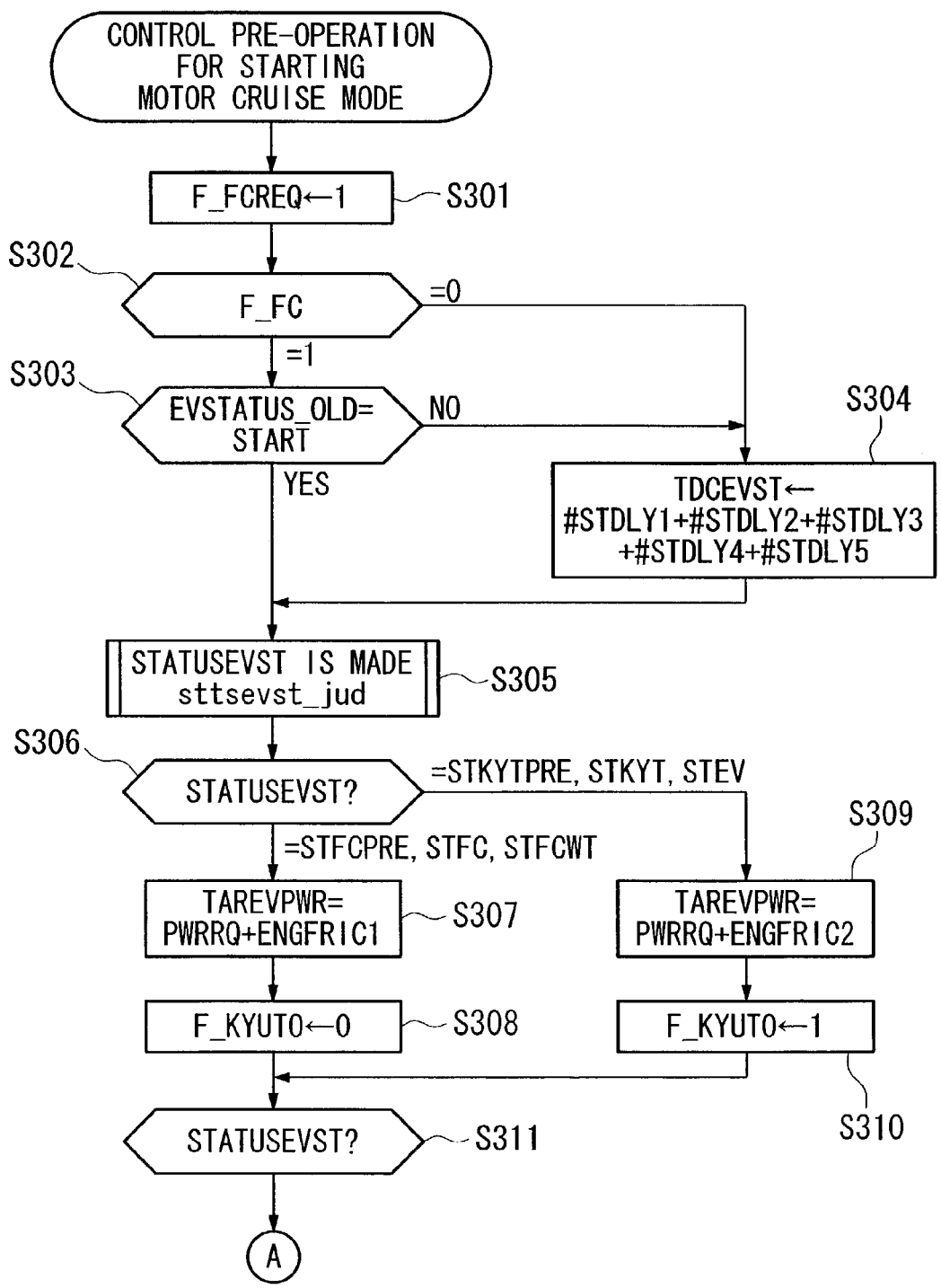
FIG. 11 is a flowchart (part 1) showing a control pre-operation for starting the motor cruise mode for the hybrid vehicle of the above embodiment.
Figure 12:
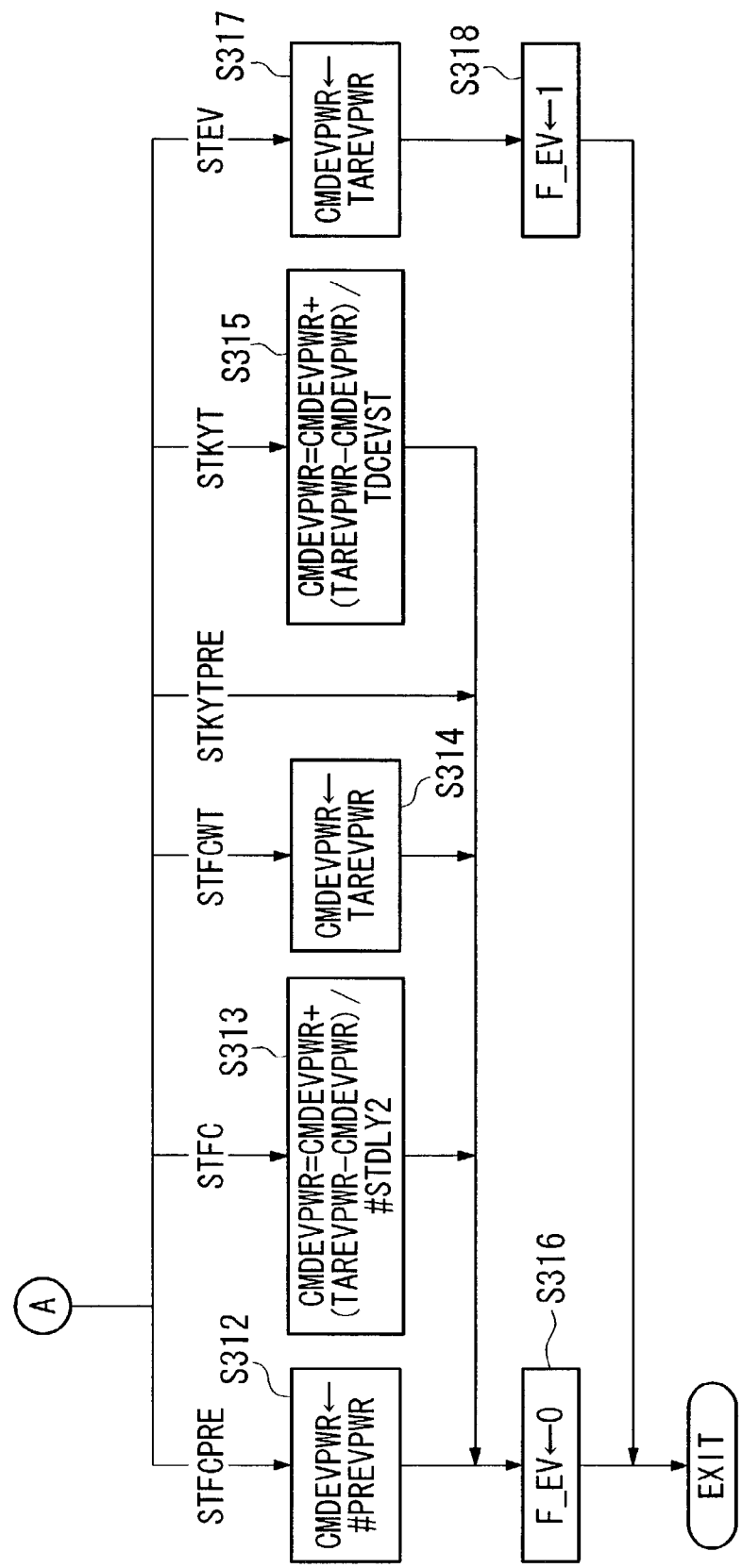
FIG. 12 is a flowchart (part 2) showing the control pre-operation for starting the motor cruise mode for the hybrid vehicle of the above embodiment.

Next, the control pre-operation for starting the motor cruise mode in step S106 in the main control routine of the motor cruise mode will be explained with reference to the flowcharts shown in FIGS. 11 and 12.

In step S301, a fuel cut request flag F_FCREQ is set to be "1", and the operation proceeds to step S302, in which it is determined whether a fuel cut flag F_FC is "1" or "0". Note that when F_FC is "1", a fuel cut operation is being executed, and when F_FC is "0", a fuel cut operation is not being executed.

When it is determined in step S302 that F_FC is "1", the operation proceeds to step S303, and when it is determined that F_FC is "0", the operation proceeds to step S304.

In step S303, it is determined whether the result of the determination, which is made in the control operation for determining current status regarding the motor cruise mode in step S105 in the main control routine of the motor cruise mode in the immediately previous routine, is "the control pre-operation for starting the motor cruise mode" (i.e., whether or not EVSTATUS_OLD=START). When the result of the determination in step S303 is "YES", i.e., the status regarding the motor cruise mode in the previous routine was "the control pre-operation for starting the motor cruise mode", the operation proceeds to step S305. In contrast, when the result of the determination in step S303 is "NO", i.e., the status regarding the motor cruise mode in the previous routine was not "the control pre-operation for starting the motor cruise mode", which means that this routine is the first-time execution of the control pre-operation for starting the motor cruise mode, the operation proceeds to step S304.

In step S304, a TDC counter TDCEVST for the control pre-operation for starting the motor cruise mode is set to be an initial value "#STDLY1+#STDLY2+#STDLY3+#STDLY4+#STDLY5".TDCEVST=#STDLY1+#STDLY2+#STDLY3+#STDLY4+#STDLY5

Then, the operation proceeds to step S305.

Figure 13:
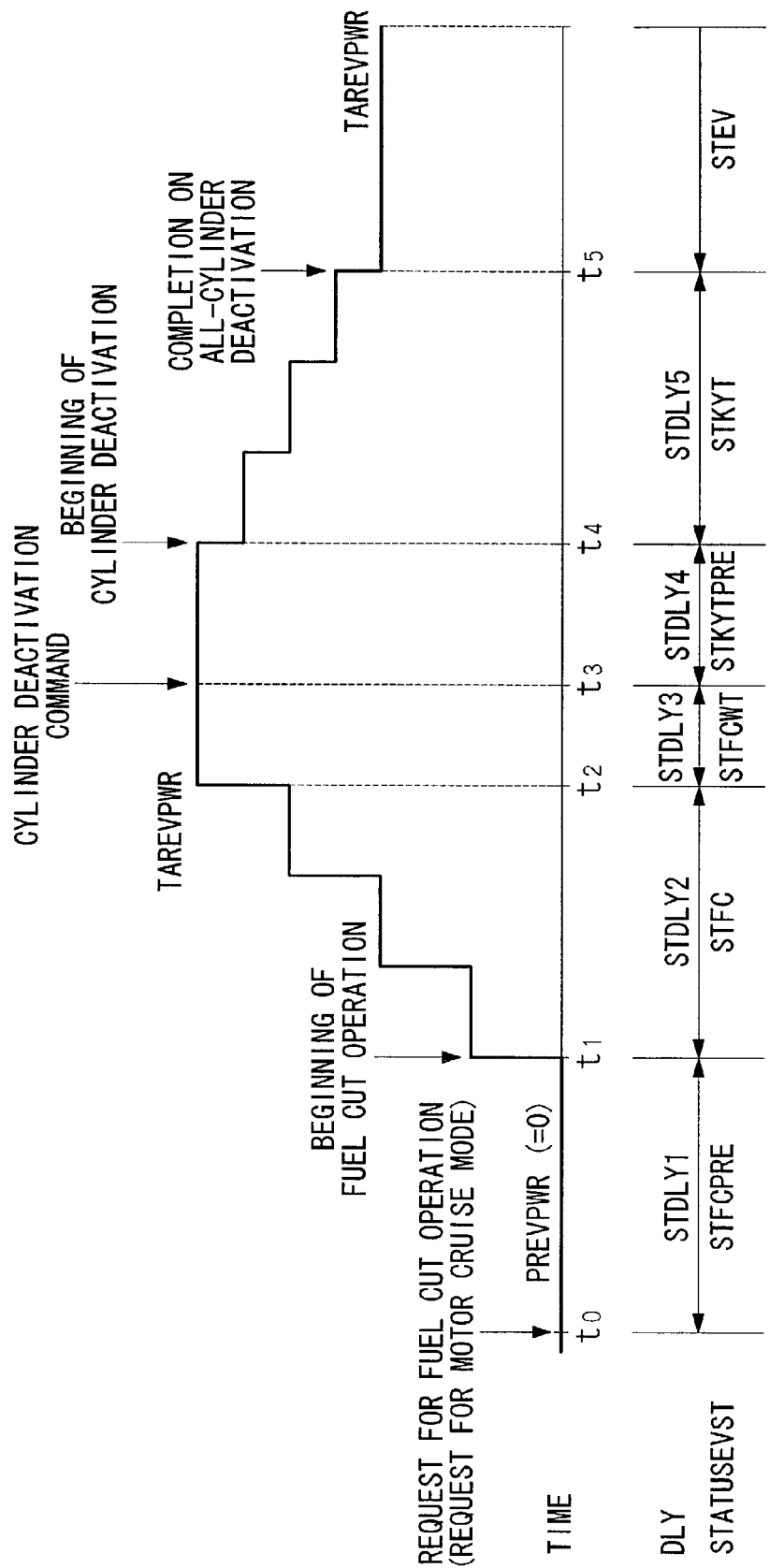
FIG. 13 is a timing chart showing a calculated final motor output power in the control pre-operation for starting the motor cruise mode.

FIG. 13 is a timing chart showing a calculated final motor output power CMDEVPWR in the control pre-operation for starting the motor cruise mode, and more specifically, FIG. 13 shows relationships among the CMDEVPWR, the STDLYs, and the status regarding the control pre-operation for starting the motor cruise mode (STATUSEVST).

The #STDLY1 corresponds to a time period from the request for the motor cruise mode (request for the fuel cut operation) to the beginning of the fuel cut operation (from time t0 to time t1 in FIG. 13), and the corresponding status regarding the control pre-operation for starting the motor cruise mode is referred to as STFCPRE.

The #STDLY2 corresponds to a time period from the beginning of the fuel cut operation to the completion of the fuel cut operation for all of the cylinders (from time t1 to time t2 in FIG. 13), and the corresponding status regarding the control pre-operation for starting the motor cruise mode is referred to as STFC.

The #STDLY3 corresponds to a time period from the completion of the fuel cut operation for all of the cylinders to the command for the cylinder deactivation (from time t2 to time t3 in FIG. 13), and the corresponding status regarding the control pre-operation for starting the motor cruise mode is referred to as STFCWT.

The #STDLY4 corresponds to a time period from the command for the cylinder deactivation to the beginning of the cylinder deactivation (from time t3 to time t4 in FIG. 13), and the corresponding status regarding the control pre-operation for starting the motor cruise mode is referred to as STKYTPRE.

The #STDLY5 corresponds to a time period from the beginning of the cylinder deactivation to the completion of the cylinder deactivation for all of the cylinders (from time t4 to time t5 in FIG. 13), and the corresponding status regarding the control pre-operation for starting the motor cruise mode is referred to as STKYT.

The status regarding the control pre-operation for starting the motor cruise mode after the all-cylinder deactivation is completed (after time t5 in FIG. 13) is referred to as STEV.

A predetermined value is subtracted from the TDC counter TDCEVST for the control pre-operation for starting the motor cruise mode every time the engine 2 passes through the top dead center (TDC).

In step S305, it is determined how far the control pre-operation for starting the motor cruise mode has been proceeded based on the value of the TDC counter TDCEVST for the control pre-operation for starting the motor cruise mode, and the operation proceeds to step S306, in which it is determined whether the current status of the control pre-operation for starting the motor cruise mode is a state before the cylinder deactivation command is made (either one of STFCPRE, STFC, and STFCWT) or is a state after the cylinder deactivation command is made (either one of STKYTPRE, STKYT, and STEV). When it is determined that the current status of the control pre-operation for starting the motor cruise mode is a state before the cylinder deactivation command is made (either one of STFCPRE, STFC, and STFCWT), the operation proceeds to step S307, in contrast, when it is determined that the current status of the control pre-operation for starting the motor cruise mode is a state after the cylinder deactivation command is made (either one of STKYTPRE, STKYT, and STEV), the operation proceeds to step S309.

In step S307, a value, which is obtained by adding the engine friction in the all-cylinder operation state ENGFRIC1 retrieved in step S101 in the main control routine of the motor cruise mode to the desired output power PWRRQ retrieved in step S201 in the control operation for determination of request for the motor cruise mode, is set to the desired motor output power TAREVPWR. In this case, because the cylinder deactivation operation is not requested to the engine 2, the operation proceeds to step S308, in which a cylinder deactivation request flag F_KYUTO is set to be "0".

In contrast, in step S309, a value, which is obtained by adding the engine friction in the all-cylinder deactivation state ENGFRIC2 retrieved in step S102 in the main control routine of the motor cruise mode to the desired output power PWRRQ retrieved in step S201 in the control operation for determination of request for the motor cruise mode, is set to the desired motor output power TAREVPWR. In this case, because the cylinder deactivation operation is requested to the engine 2, the operation proceeds to step S310, in which a cylinder deactivation request flag F_KYUTO is set to be "1".

After executing step S308 or S310, the operation proceeds to step S311, in which it is determined which one is the current status of the control pre-operation for starting the motor cruise mode, STFCPRE, STFC, STFCWT, STKYTPRE, STKYT, or STEV.

When it is determined in step S311 that the current status of the control pre-operation for starting the motor cruise mode is STFCPRE, the operation proceeds to step S312, in which the calculated final motor output power CMDEVPWR is set to be PREVPWR. The initial value of PREVPWR is "0".

$$CMDEVPWR=PREVPWR$$

When it is determined in step S311 that the current status of the control pre-operation for starting the motor cruise mode is STFC, the operation proceeds to step S313, in which a value, which is obtained by adding, the quotient, which is obtained by dividing a value obtained by subtracting the calculated final motor output power CMDEVPWR in the immediately previous routine from the desired motor output power TAREVPWR by remaining #STDLY2, to the calculated final motor output power CMDEVPWR in the immediately previous routine, is set to the calculated final motor output power CMDEVPWR in this routine. In this case, TAREVPWR is "PWRRQ+ENGFRIC1" calculated in step S307.

$$CMDEVPWR=CMDEVPWR+\{(TAREVPWR-CMDEVPWR)/\#STDLY2\}$$

In the above equation, #STDLY2 is #STDLY2 remaining at the present time. By setting the calculated final motor output power CMDEVPWR as explained above, the output power of the motor-generator 3 is gradually increased stepwise in the STFC period as shown in FIG. 13.

When it is determined in step S311 that the current status of the control pre-operation for starting the motor cruise mode is STFCWT, the operation proceeds to step S314, in which TAREVPWR is set to the calculated final motor output power CMDEVPWR. In this case, TAREVPWR is also "PWRRQ+ENGFRIC1" calculated in step S307.

When it is determined in step S311 that the current status of the control pre-operation for starting the motor cruise mode is STKYTPRE, the status in the immediately previous routine is maintained.

When it is determined in step S311 that the current status of the control pre-operation for starting the motor cruise mode is STKYT, the operation proceeds to step S315, in which a value, which is obtained by adding, the quotient, which is obtained by dividing a value obtained by subtracting the calculated final motor output power CMDEVPWR in the immediately previous routine from the desired motor output power TAREVPWR by TDCEVST (i.e., remaining #STDLY5), to the calculated final motor output power CMDEVPWR in the immediately previous routine, is set to the calculated final motor output power CMDEVPWR in this routine. In this case, TAREVPWR is "PWRRQ+ENGFRIC2" calculated in step S309.

$$CMDEVPWR=CMDEVPWR+\{(TAREVPWR-CMDEVPWR)/TDCEVST\}$$

By setting the calculated final motor output power CMDEVPWR as explained above, the output power of the motor-generator 3 is gradually decreased stepwise in the STKYT period as shown in FIG. 13.

When it is determined in step S311 that the current status of the control pre-operation for starting the motor cruise mode is STEV, the operation proceeds to step S317, in which TAREVPWR is set to the calculated final motor output power CMDEVPWR. In this case, TAREVPWR is also "PWRRQ+ENGFRIC2" calculated in step S309.

After executing one of the control operations in steps S312, S313, S314, and S315, or when it is determined in step S311 that the current status of the control pre-operation for starting the motor cruise mode is STKYTPRE, the operation proceeds to step S316, in which a motor cruise mode request flag F_EV is set to be "1", and then the control operation in this routine is once terminated.

When the motor cruise mode request flag F_EV is "0", the control pre-operation for starting the motor cruise mode is being executed, and when the motor cruise mode request flag F_EV is "1", the control pre-operation for starting the motor cruise mode is finished. After the flag F_EV becomes "1", the operation proceeds to the control operation for the motor cruise mode in step S107 in the main control routine of the motor cruise mode shown in FIG. 4.

Control Pre-Operation for Finishing the Motor Cruise Mode

Figure 14:
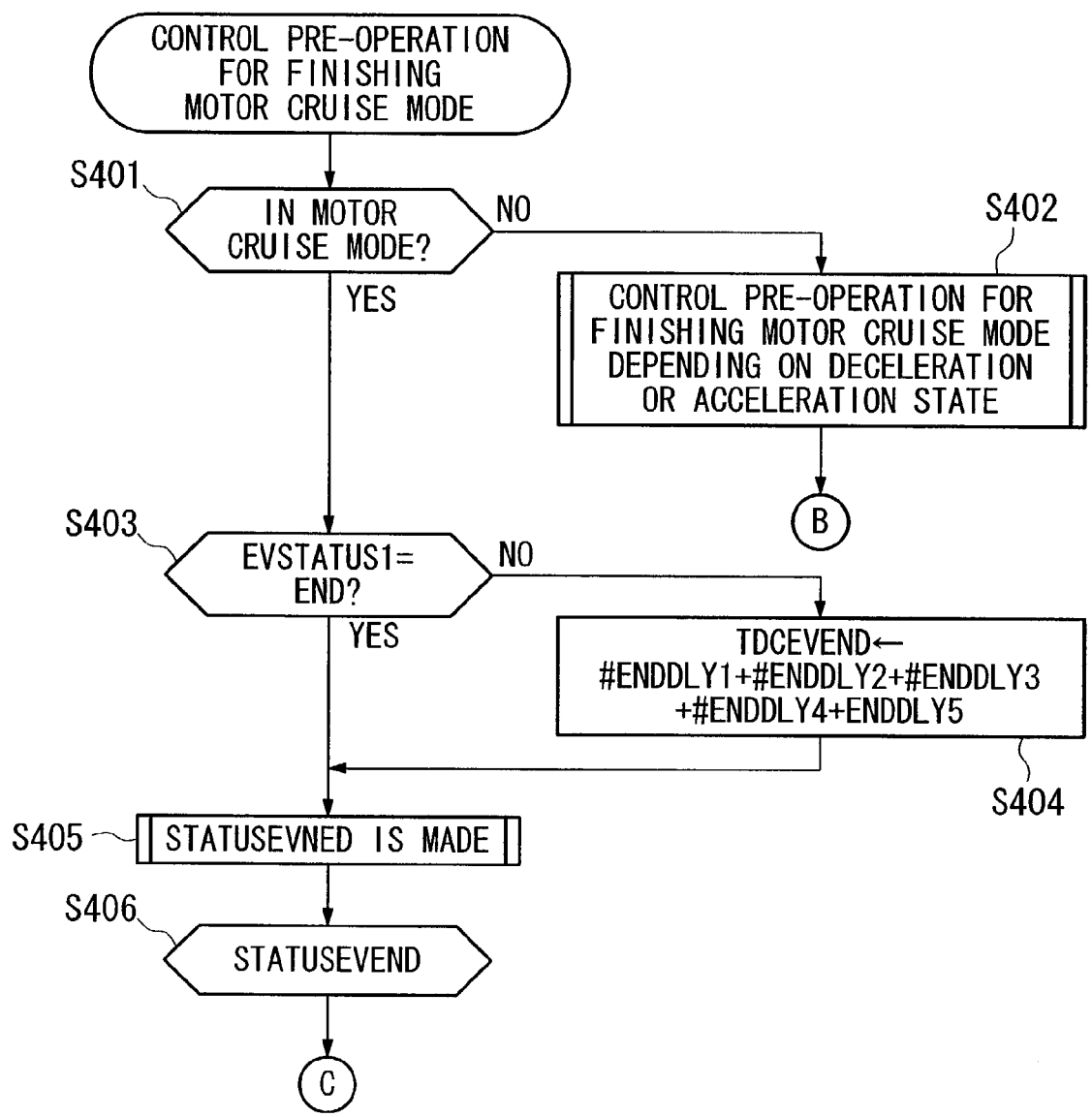
FIG. 14 is a flowchart (part 1) showing a control pre-operation for finishing the motor cruise mode for the hybrid vehicle of the above embodiment.
Figure 15:
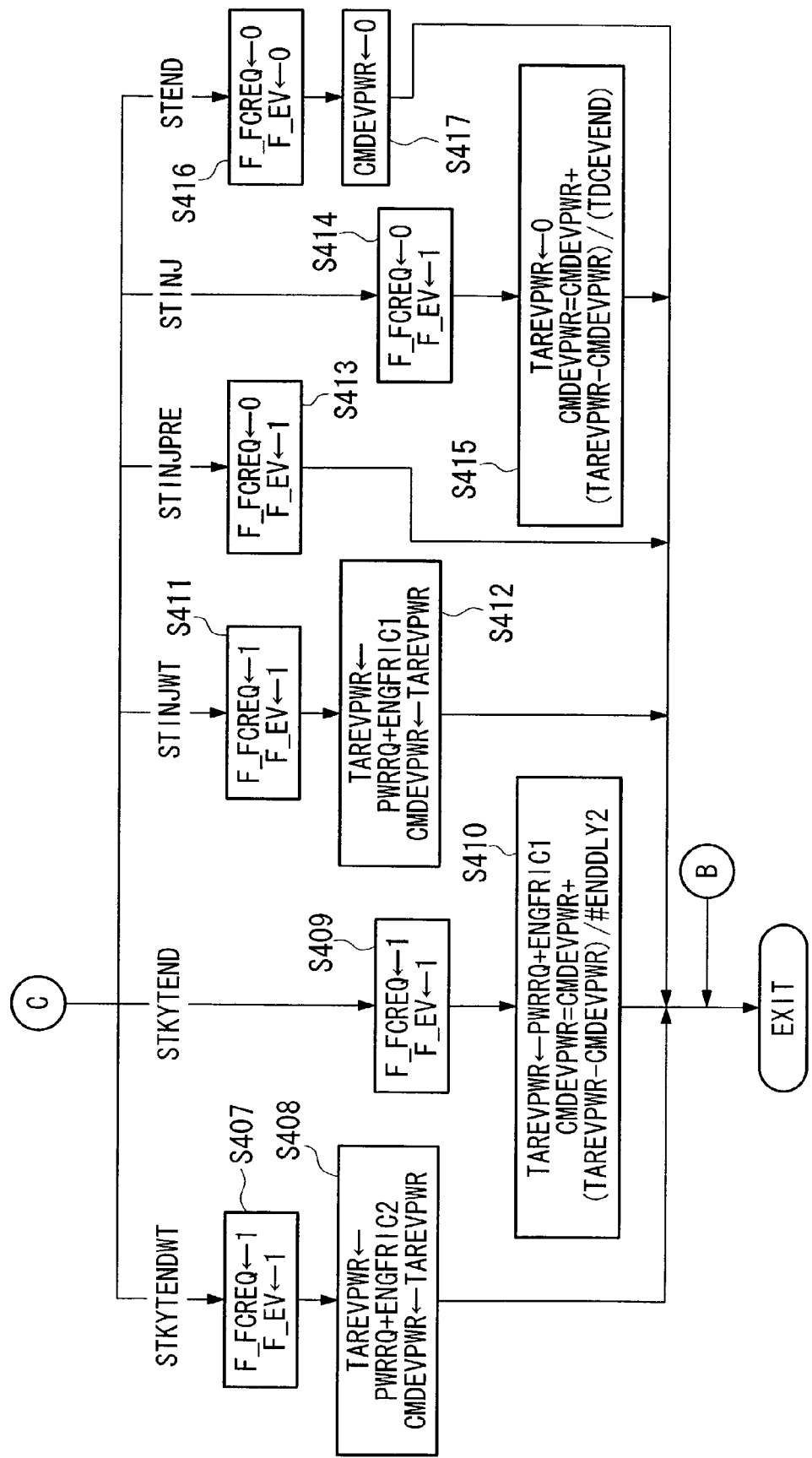
FIG. 15 is a flowchart (part 2) showing the control pre-operation for finishing the motor cruise mode for the hybrid vehicle of the above embodiment.

Next, the control pre-operation for finishing the motor cruise mode in step S108 in the main control routine of the motor cruise mode will be explained with reference to the flowcharts shown in FIGS. 14 and 15.

In step S401, it is determined whether the current status is in the motor cruise mode. When the result of the determination in step S401 is "NO", the operation proceeds to step S402, in which the control pre-operation for finishing the motor cruise mode is executed depending on the current status. More specifically, when the vehicle is in a deceleration state, the control pre-operation for finishing the motor cruise mode for transitioning to the regenerative operation is executed, and when the vehicle is in an acceleration state, the control pre-operation for finishing the motor cruise mode for immediately switching to the engine cruise mode is executed. After executing the operation in step S402, the control operation in this routine is once terminated.

When the result of the determination in step S401 is "YES" (i.e., in the motor cruise mode), the operation proceeds to step S403, in which it is determined whether the result of the control operation for determining current status regarding the motor cruise mode in step S105 in the immediately previous main control routine of the motor cruise mode is "the control pre-operation for finishing the motor cruise mode" (whether EVSTATUS=END). When the result of the determination in step S403 is "NO" (the immediately previous status regarding the motor cruise mode is not the control pre-operation for finishing the motor cruise mode), i.e., this routine is the first-time execution of the control pre-operation for finishing the motor cruise mode, the operation proceeds to step S404. In contrast, when the result of the determination in step S403 is "YES" (the immediately previous status regarding the motor cruise mode is the control pre-operation for finishing the motor cruise mode), the operation proceeds to step S405.

In step S404, a TDC counter TDCEVEND for the control pre-operation for finishing the motor cruise mode is set to be an initial value "#ENDDLY1+#ENDDLY2+#ENDDLY3+#ENDDLY4+ #ENDDLY5".TDCEVEND=#ENDDLY1+#ENDDLY2+ #ENDDLY3+#ENDDLY4+#ENDDLY5

Then, the operation proceeds to step S405.

Figure 16:
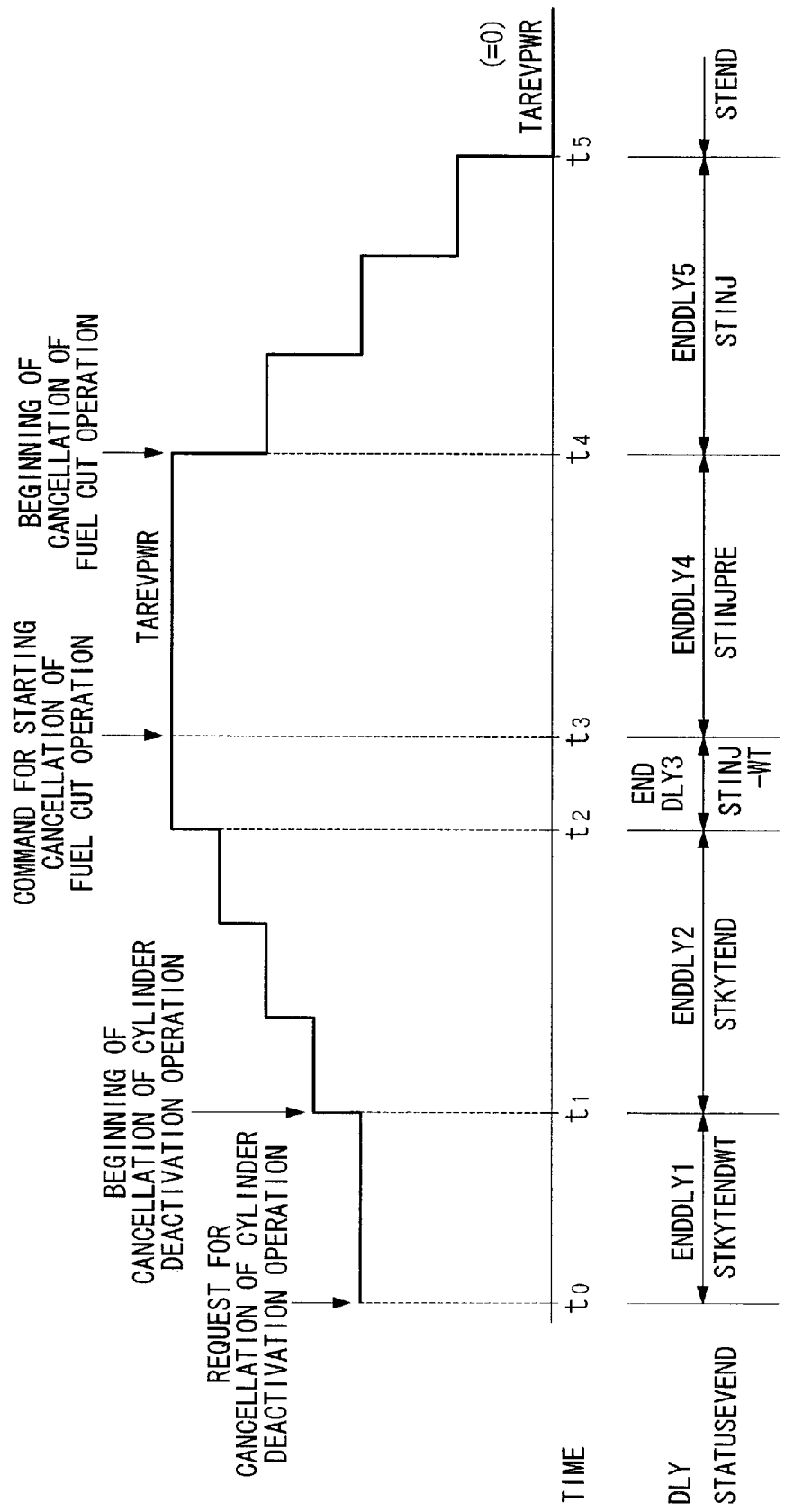
FIG. 16 is a timing chart showing a calculated final motor output power in the control pre-operation for finishing the motor cruise mode.

FIG. 16 is a timing chart showing a calculated final motor output power CMDEVPWR in the control pre-operation for finishing the motor cruise mode, and more specifically, FIG. 16 shows relationships among the CMDEVPWR, the ENDDLYs, and the status regarding the control pre-operation for finishing the motor cruise mode (STATUSEVEND).

The #ENDDLY1 corresponds to a time period from the request for cancellation of the cylinder deactivation operation (request for the engine cruise mode) to the beginning of the cancellation of the cylinder deactivation operation (from time t0 to time t1 in FIG. 16), and the corresponding status regarding the control pre-operation for finishing the motor cruise mode is referred to as STKYTENDWT.

The #ENDDLY2 corresponds to a time period from the beginning of the cancellation of the cylinder deactivation operation to the completion of the cancellation of the cylinder deactivation operation for all of the cylinders (from time t1 to time t2 in FIG. 16), and the corresponding status regarding the control pre-operation for finishing the motor cruise mode is referred to as STKYTEND.

The #ENDDLY3 corresponds to a time period from the completion of the cancellation of the cylinder deactivation operation for all of the cylinders to the request for cancellation of the fuel cut operation (from time t2 to time t3 in FIG. 13), and the corresponding status regarding the control pre-operation for finishing the motor cruise mode is referred to as STINJWT.

The #STDLY4 corresponds to a time period from the request for cancellation of the fuel cut operation to the beginning of the cancellation of the fuel cut operation (from time t3 to time t4 in FIG. 16), and the corresponding status regarding the control pre-operation for finishing the motor cruise mode is referred to as STINJPRE.

The #ENDDLY5 corresponds to a time period from the beginning of the cancellation of the fuel cut operation to the completion of the fuel cut operation for all of the cylinders (from time t4 to time t5 in FIG. 16), and the corresponding status regarding the control pre-operation for finishing the motor cruise mode is referred to as STINJ.

The status regarding the control pre-operation for finishing the motor cruise mode after the all-cylinder deactivation is completed (after time t5 in FIG. 16) is referred to as STEND.

A predetermined value is subtracted from the TDC counter TDCEVEND for the control pre-operation for finishing the motor cruise mode every time the engine 2 passes through the top dead center (TDC).

In step S405, it is determined how far the control pre-operation for finishing the motor cruise mode has been proceeded based on the value of the TDC counter TDCEVEND for the control pre-operation for finishing the motor cruise mode, and the operation proceeds to step S406, in which it is determined which one is the current status of the control pre-operation for finishing the motor cruise mode, STKYTENDWT, STKYTEND, STINJWT, STINJPRE, STINJ, or STEND.

When it is determined in step S406 that the current status of the control pre-operation for finishing the motor cruise mode is STKYTENDWT, the operation proceeds to step S407, in which the fuel cut request flag F_FCREQ is set to be "1", and the motor cruise mode request flag F_EV is set to be "1". Then, the operation proceeds from step S407 to step S408, in which a value, which is obtained by adding the engine friction in the all-cylinder deactivation state ENGFRIC2 retrieved in step S102 in the main control routine of the motor cruise mode to the desired output power PWRRQ retrieved in step S201 in the control operation for determination of request for the motor cruise mode, is set to the desired motor output power TAREVPWR, and this TAREVPWR is set to the calculated final motor output power CMDEVPWR, and then the control operation in this routine is once terminated.

$$CMDEVPWR = TAREVPWR = (PWRRQ + ENGFRIC2)$$

When it is determined in step S406 that the current status of the control pre-operation for finishing the motor cruise mode is STKYTEND, the operation proceeds to step S409, in which the fuel cut request flag F_FCREQ is set to be "1", and the motor cruise mode request flag F_EV is set to be "1". Then, the operation proceeds from step S409 to step S410, in which desired motor output power TAREVPWR and the calculated final motor output power CMDEVPWR are set, and then the control operation in this routine is once terminated. More specifically, a value, which is obtained by adding the engine friction in the all-cylinder operation state ENGFRIC1 retrieved in step S102 in the main control routine of the motor cruise mode to the desired output power PWRRQ retrieved in step S201 in the control operation for determination of request for the motor cruise mode, is set to the desired motor output power TAREVPWR. In addition, a value, which is obtained by adding, the quotient, which is obtained by dividing a value obtained by subtracting the calculated final motor output power CMDEVPWR in the immediately previous routine from the desired motor output power TAREVPWR by remaining #ENDDLY2, to the calculated final motor output power CMDEVPWR in the immediately previous routine, is set to the calculated final motor output power CMDEVPWR in this routine.

$$TAREVPWR = PWRRQ + ENGFRIC1$$

$$CMDEVPWR = CMDEVPWR + \{(TAREVPWR - CMDEVPWR)/\#ENDDLY2\}$$

In the above equation, #ENDDLY2 is #ENDDLY2 remaining at the present time. By setting the calculated final motor output power CMDEVPWR as explained above, the output power of the motor-generator 3 is gradually increased stepwise in the STKYTEND period as shown in FIG. 16.

When it is determined in step S406 that the current status of the control pre-operation for finishing the motor cruise mode is STINJWT, the operation proceeds to step S411, in which the fuel cut request flag F_FCREQ is set to be "1", and the motor cruise mode request flag F_EV is set to be "1". Then, the operation proceeds from step S411 to step S412, in which a value, which is obtained by adding the engine friction in the all-cylinder operation state ENGFRIC1 retrieved in step S101 in the main control routine of the motor cruise mode to the desired output power PWRRQ retrieved in step S201 in the control operation for determination of request for the motor cruise mode, is set to the desired motor output power TAREVPWR, and this TAREVPWR is set to the calculated final motor output power CMDEVPWR, and then the control operation in this routine is once terminated.

$$CMDEVPWR = TAREVPWR = (PWRRQ + ENGFRIC1)$$

When it is determined in step S406 that the current status of the control pre-operation for finishing the motor cruise mode is STFNJPRE, the operation proceeds to step S413, in which the fuel cut request flag F_FCREQ is set to be "0", and the motor cruise mode request flag F_EV is set to be "1", and then the control operation in this routine is once terminated. Accordingly, in the STINJPRE period, the calculated final motor output power CMDEVPWR is maintained to be the value in the previous routine, and because the flag F_FCREQ is set to be "0", the cancellation of the fuel cut operation is requested.

When it is determined in step S406 that the current status of the control pre-operation for finishing the motor cruise mode is STINJ, the operation proceeds to step S414, in which the fuel cut request flag F_FCREQ is set to be "0", and the motor cruise mode request flag F_EV is set to be "1". Then, the operation proceeds from step S414 to step S415, in which a value, which is obtained by adding, the quotient, which is obtained by dividing a value obtained by subtracting the calculated final motor output power CMDEVPWR in the immediately previous routine from the desired motor output power TAREVPWR by TDCEVEND (i.e., remaining #ENDDLY5), to the calculated final motor output power CMDEVPWR in the immediately previous routine, is set to the calculated final motor output power CMDEVPWR in this routine, and then the control operation in this routine is once terminated.

$$TAREVPWR = 0$$

$$CMDEVPWR = CMDEVPWR + \{(TAREVPWR - CMDEVPWR)/TDCEVEND\}$$

By setting the calculated final motor output power CMDEVPWR as explained above, the output power of the motor-generator 3 is gradually decreased stepwise in the STINJ period, and finally becomes "0" as shown in FIG. 16.

When it is determined in step S406 that the current status of the control pre-operation for finishing the motor cruise mode is STEND, the operation proceeds to step S416, in which the fuel cut request flag F_FCREQ is set to be "0", and the motor cruise mode request flag F_EV is set to be "0", and then the operation proceeds to step S417, in which the calculated final motor output power CMDEVPWR is set to be "0", and then the control operation in this routine is once terminated. At this time, the switching operation from the motor cruise mode to the engine cruise mode is completed.

Control Operation for Calculating the Starting Clutch Oil Pressure Correction Coefficient Next, the control operation for calculating the starting clutch oil pressure correction coefficient will be explained with reference to the flowcharts shown in FIGS. 17 and 18.

Figure 17:
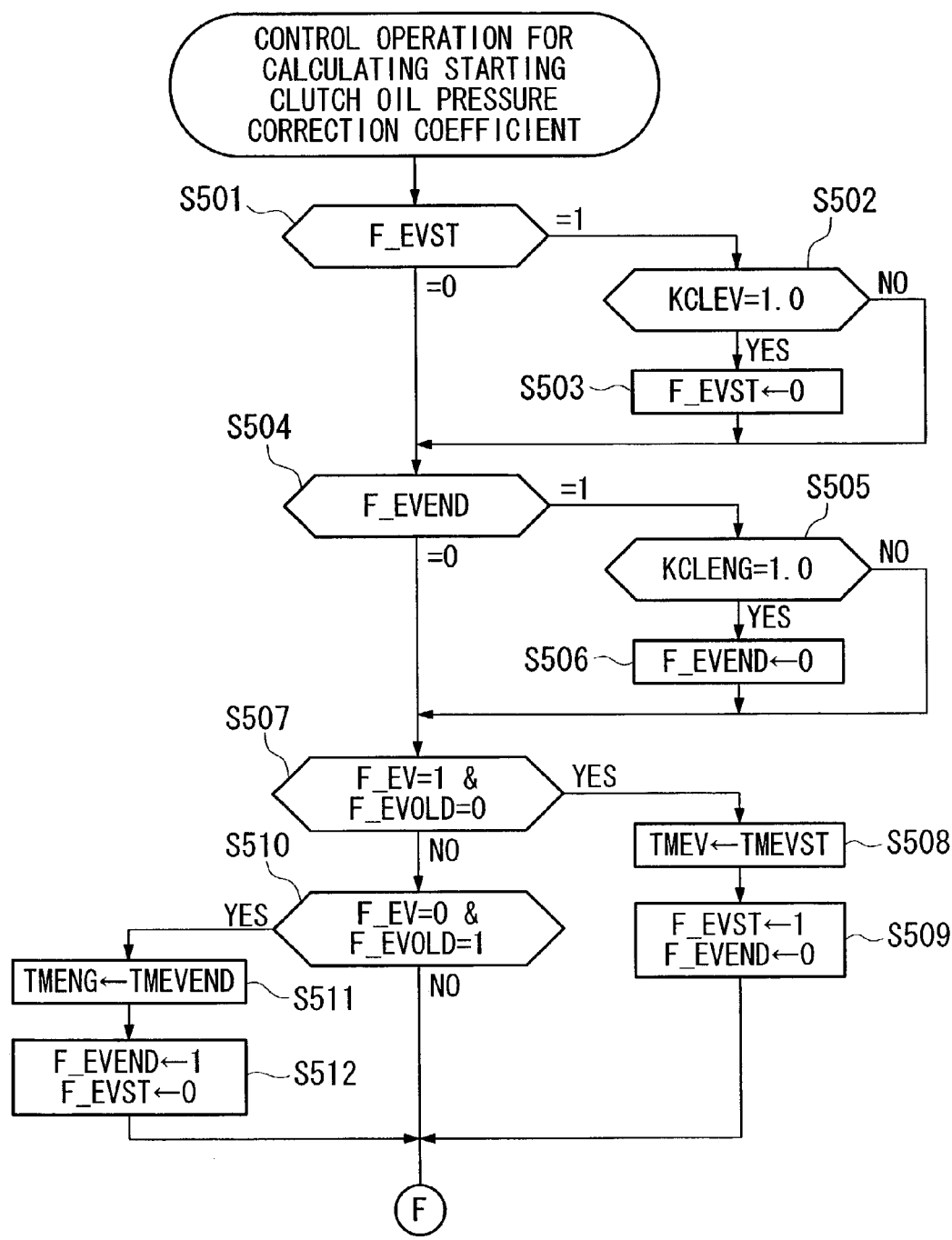
FIG. 17 is a flowchart (part 1) showing a control operation for calculating the starting clutch oil pressure correction coefficient for the hybrid vehicle of the above embodiment.
Figure 18:
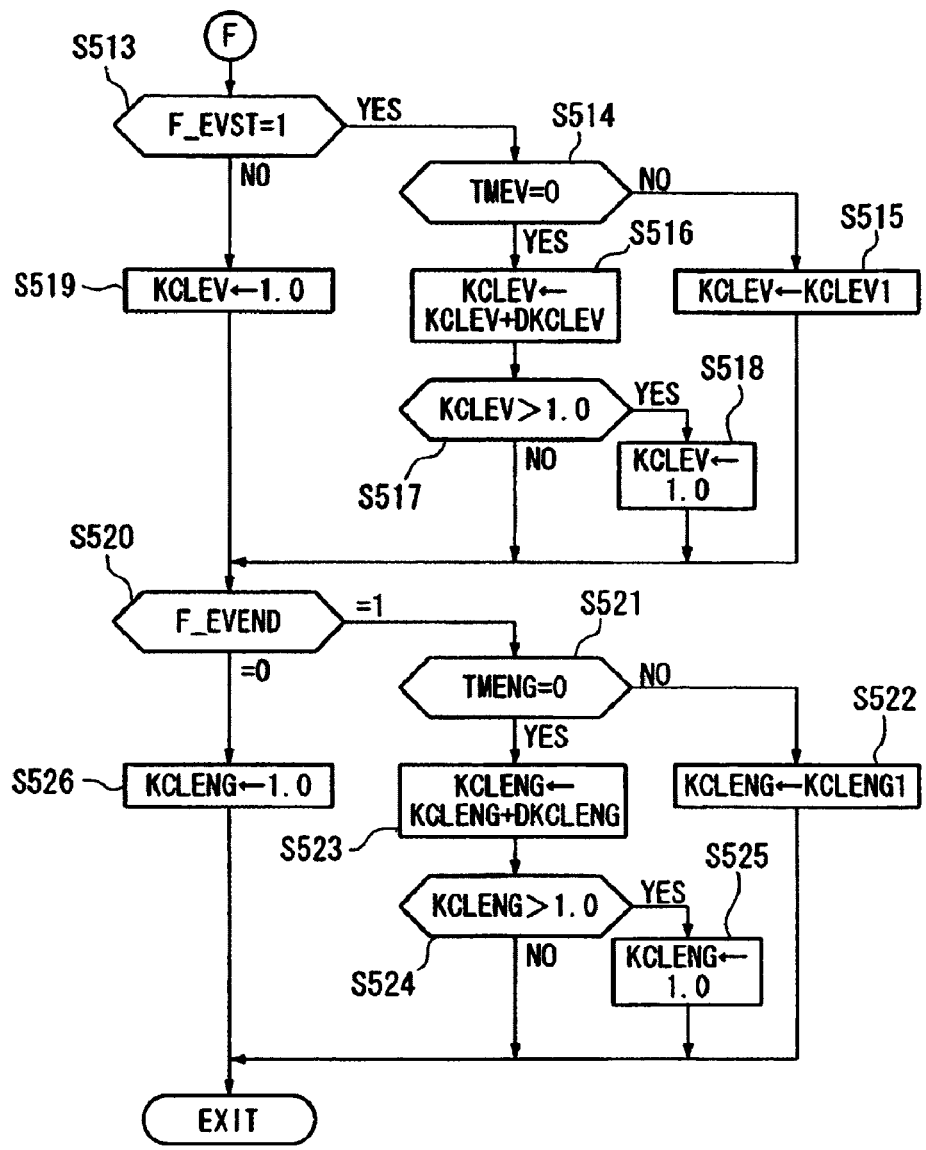
FIG. 18 is a flowchart (part 2) showing the control operation for calculating the starting clutch oil pressure correction coefficient for the hybrid vehicle of the above embodiment.

The flowcharts shown in FIGS. 17 and 18 show the control routine for calculating the starting clutch oil pressure correction coefficient, which is repeatedly and periodically executed by the ECU 19.

In step S501, it is determined whether the value of a flag F_EVST, which indicates that correction of the starting clutch oil pressure at the beginning of the motor cruise mode is executed, is "0" or "1". When it is determined in step S501 that the value of the flag F_EVST is "1" (i.e., correction of the starting clutch oil pressure at the beginning of the motor cruise mode is being executed), the operation proceeds to step S502, in which it is determined whether the value of the starting clutch oil pressure correction coefficient KCLEV at the beginning of the motor cruise mode is 1.0.

When the result of the determination in step S502 is "YES" (i.e., KCLEV=1.0), the operation proceeds to step S503, in which the flag F_EVST is set to be "0".

In contrast, when it is determined in step S501 that the value of the flag F_EVST is "0" (i.e., correction of the starting clutch oil pressure at the beginning of the motor cruise mode is not executed), and the result of the determination in step S502 is "NO" (i.e., KCLEV≠1.0), and the operation in step S503 is executed, the operation proceeds to step S504, in which it is determined whether the value of a flag F_EVEND, which indicates that correction of the starting clutch oil pressure at the end of the motor cruise mode is executed, is "0" or "1".

When it is determined in step S504 that the value of the flag F_EVEND is "1" (i.e., correction of the starting clutch oil pressure at the end of the motor cruise mode is being executed), the operation proceeds to step S505, in which it is determined whether the value of the starting clutch oil pressure correction coefficient KCLENG at the end of the motor cruise mode is 1.0.

When the result of the determination in step S505 is "YES" (i.e., KCLENG=1.0), the operation proceeds to step S506, in which the flag F_EVEND is set to be "0".

In contrast, when it is determined in step S504 that the value of the flag F_EVEND is "0" (i.e., correction of the starting clutch oil pressure at the beginning of the motor cruise mode is not executed), and the result of the determination in step S505 is "NO" (i.e., KCLENG≠1.0), and the operation in step S506 is executed, the operation proceeds to step S507.

In step S507, it is determined whether the current motor cruise mode request flag F_EV is "1", and whether the previous motor cruise mode request flag F_EVOLD is "0". In other words, it is determined whether the motor cruise mode request flag F_EV becomes "1" in this routine.

When the result of the determination in step S507 is "YES" (i.e., the motor cruise mode request flag F_EV becomes "1" in this routine), the operation proceeds to step S508, in which an oil pressure maintaining timer TMEV at the beginning of the motor cruise mode is set to be an initial value TMEVST, and then the operation proceeds to step S509, in which the flag F_EVST, which indicates that correction of the starting clutch oil pressure at the beginning of the motor cruise mode is executed, is set to be "1", and the flag F_EVEND, which indicates that correction of the starting clutch oil pressure at the end of the motor cruise mode is executed, is set to be "0".

In contrast, when the result of the determination in step S507 is "NO" (i.e., the motor cruise mode request flag F_EV was also "1" in the previous routine), the operation proceeds to step S510, in which it is determined whether the current motor cruise mode request flag F_EV is "0", and whether the previous motor cruise mode request flag F_EVOLD is "1".

When the result of the determination in step S510 is "YES" (i.e., the motor cruise mode request flag F_EV becomes "1" in this routine), the operation proceeds to step S511, in which an oil pressure maintaining timer TMENG at the end of the motor cruise mode is set to be an initial value TMEVEND, and then the operation proceeds to step S512, in which the flag F_EVEND, which indicates that correction of the starting clutch oil pressure at the end of the motor cruise mode is executed, is set to be "1", and the flag F_EVST, which indicates that correction of the starting clutch oil pressure at the beginning of the motor cruise mode is executed, is set to be "0".

In contrast, when the result of the determination in step S510 is "NO" (i.e., the motor cruise mode request flag F_EV was also "0" in the previous routine), and the operation in step S509 is executed, and the operation in step S512 is executed, the operation proceeds to step S513.

Instep S513, it is determined whether the flag F_EVST is "1". When the result of the determination is "YES" (F_EVST=1), the operation proceeds to step S514, and when the result of the determination is "NO" (F_EVST≠1), the operation proceeds to step S519.

In step S514, it is determined whether the oil pressure maintaining timer TMEV at the beginning of the motor cruise mode is "0".

When the result of the determination in step S514 is "NO" (TMEV≠0), the operation proceeds to step S515, in which the value of the starting clutch oil pressure correction coefficient KCLEV at the beginning of the motor cruise mode is set to be an initial oil pressure correction coefficient KCLEV1, and then the operation proceeds to step S520. This control operation corresponds to time t0 to time t3 in the timing charts shown in FIGS. 2 and 13, and corresponds to STFCPRE, STFC, and STFCWT in the control pre-operation for starting the motor cruise mode.

When the result of the determination in step S514 is "YES" (TMEV=0), the operation proceeds to step S516, in which a value, which is obtained by adding a starting clutch oil pressure correction coefficient additional term DKCLEV at the beginning of the motor cruise mode to the previous starting clutch oil pressure correction coefficient KCLEV at the beginning of the motor cruise mode, is set to the current starting clutch oil pressure correction coefficient KCLEV at the beginning of the motor cruise mode.

$$KCLEV=KCLEV+DKCLEV$$

Next, the operation proceeds to step S517, in which it is determined whether KCLEV is greater than 1.0. When the result of the determination in step S517 is "NO" (KCLEV<1.0), the operation proceeds to step S520. This control operation corresponds to time t3 to time t6 in the timing charts shown in FIGS. 2 and 13.

In contrast, when the result of the determination in step S517 is "YES" (KCLEV>1.0), the operation proceeds to step S518, in which KCLEV is set to be 1.0, and the operation proceeds to step S520. This control operation corresponds to after time t6 in the timing charts shown in FIGS. 2 and 13.

When the operation proceeds to step S519 after having the result of the determination in step S513 is "NO" (F_EVST≠1), KCLEV is set to be 1.0 in step S519, and then the operation proceeds to step S520.

In step S520, it is determined whether the flag F_EVEND, which indicates that correction of the starting clutch oil pressure at the end of the motor cruise mode is executed, is "1" or "0". When it is determined that "F_EVEND=1", the operation proceeds to step S521, and when it is determined that "F_EVEND=0", the operation proceeds to step S526.

In step S521, it is determined whether the oil pressure maintaining timer TMENG at the end of the motor cruise mode is "0".

When the result of the determination in step S521 is "NO" (TMENG≠0), the operation proceeds to step S522, in which the value of the starting clutch oil pressure correction coefficient KCLENG at the end of the motor cruise mode is set to be an initial oil pressure correction coefficient KCLENG1, and then the control operation in this routine is once terminated. This control operation corresponds to time t0 to time t3 in the timing charts shown in FIGS. 3 and 16, and corresponds to STKYTENDWT, STKYTEND, and STINJWT in the control pre-operation for finishing the motor cruise mode.

When the result of the determination in step S521 is "YES" (TMENG=0), the operation proceeds to step S523, in which a value, which is obtained by adding a starting clutch oil pressure correction coefficient additional term DKCLENG at the end of the motor cruise mode to the previous starting clutch oil pressure correction coefficient KCLENG at the end of the motor cruise mode, is set to the current starting clutch oil pressure correction coefficient KCLEV at the beginning of the motor cruise mode.

$$KCLENG=KCLENG+DKCLENG$$

Next, the operation proceeds to step S524, in which it is determined whether KCLENG is greater than 1.0. When the result of the determination in step S524 is "NO" (KCLENG≦1.0), and the control operation in this routine is once terminated. This control operation corresponds to time t3 to time t5 in the timing charts shown in FIGS. 3 and 16.

In contrast, when the result of the determination in step S524 is "YES" (KCLENG>1.0), the operation proceeds to step S525, in which KCLENG is set to be 1.0, and the control operation in this routine is once terminated. This control operation corresponds to after time t5 in the timing charts shown in FIGS. 3 and 16.

When the operation proceeds to step S526 after having the result of the determination in step S520 is "F_EVEND=0", KCLENG is set to be 1.0 in step S526, and the control operation in this routine is once terminated.

Note that the desired oil pressure for the starting clutch CLCMD is calculated by multiplying the previous desired oil pressure for the starting clutch CLCMD by the starting clutch oil pressure correction coefficient KCLEV at the beginning of the motor cruise mode, and by the starting clutch oil pressure correction coefficient KCLENG at the end of the motor cruise mode.

$$CLCMD=(CLCMD)\times(KCLEV)\times(KCLENG)$$

Advantageous Effects Obtainable by the Invention

As explained above, according to the present invention, the motor cruise mode can be effectively used in a driving state in which the engine cannot run with high efficiency. In addition, when the driving mode of the vehicle is switched from the engine cruise mode to the motor cruise mode, a drag feeling due to a fuel cut operation can be reduced, and when the driving mode of the vehicle is switched from the motor cruise mode to the engine cruise mode, a combustion initiation jolt due to start of the engine operation can be also reduced; therefore, vehicle behavior during the switching operation of the driving mode between the motor cruise mode and the engine cruise mode is stabilized, and drivability can be improved.

Moreover, according to the present invention, because the pumping loss of the engine can be reduced during the motor cruise mode, fuel efficiency can be further improved. In addition, because a vehicle jolt, which is caused by changes in the friction of the engine due to stop or start of the operations of the intake and exhaust valves when the driving mode of the vehicle is switched between the engine cruise mode and the motor cruise mode, can be reduced, vehicle behavior during the switching operation of the driving mode between the motor cruise mode and the engine cruise mode is stabilized, and drivability can be improved.

In addition, according to the present invention, because a frequent switching of the driving mode between the engine cruise mode and the motor cruise mode, i.e., a hunting phenomenon, can be prevented, drivability can be improved. Moreover, increase in fuel consumption of the engine associated with switching of the driving mode and increase in power of the motor can be minimized.

Furthermore, according to the present invention, the driving mode of the vehicle can be switched depending on the determination result in the driving mode determining section, i.e., the motor cruise mode is selected when the desired driving power is equal to or less than the driving power obtainable from the motor, and the engine cruise mode is selected when the desired driving power is greater than the driving power obtainable from the motor.

What is claimed is:

1. A hybrid vehicle comprising:
    an engine, and a motor being capable of generating electrical power as power sources;
    an output shaft to which a driving power from at least one of the engine and the motor is transmitted for driving the vehicle in an engine cruise mode in which the vehicle is driven by the engine, or in a motor cruise mode in which the vehicle is driven by the motor;
    a clutch section which is provided between the engine and motor and a pair of axle shafts, and which is adapted to selectively disconnect the driving powers of the engine and the motor; and
    a control section which is adapted to control the clutch section, when the driving mode of the vehicle is switched between the engine cruise mode and the motor cruise mode alternately, so that the engagement degree of the clutch section is once decreased at switching, and then the decreased engagement degree of the clutch section is gradually increased and recovered,
    wherein the control section is further adapted to control the engine so as to deactivate at least one of the cylinders of the engine during the motor cruise mode, and
    wherein the control section is further adapted to control the driving power of the motor, when the driving mode of the vehicle is switched from the engine cruise mode to the motor cruise mode, so as to compensate for chances in the friction of the engine due to the cylinder deactivation operation.

2. A hybrid vehicle as claimed in claim 1, wherein the control section is further adapted to control the engine and motor so that the driving mode of the vehicle is not switched from the engine cruise mode to the motor cruise mode during a predetermined time period from the beginning of the engine cruise mode.

3. A hybrid vehicle comprising:
    an engine, and a motor being capable of generating electrical power as power sources;
    an output shaft to which a driving power from at least one of the engine and the motor is transmitted for driving the vehicle in an engine cruise mode in which the vehicle is driven by the engine, or in a motor cruise mode in which the vehicle is driven by the motor;
    a clutch section which is provided between the engine and motor and a pair of axle shafts, and which is adapted to selectively disconnect the driving powers of the engine and the motor;
    a control section which is adapted to control the clutch section, when the driving mode of the vehicle is switched between the engine cruise mode and the motor cruise mode alternately, so that the engagement degree of the clutch section is once decreased at switching, and then the decreased engagement degree of the clutch section is aradually increased and recovered; and
    a driving mode determining section which sets the driving mode of the vehicle either in the engine cruise mode or in the motor cruise mode by comparing a required driving power, which is determined by the traveling speed of the vehicle and opening degree of an accelerator or of a throttle pedal, with a predetermined driving power obtainable from the motor, and
    wherein the driving mode determining section comprises a filter which is used to limit a range of change of the desired driving power when the desired driving power is determined.

4. A hybrid vehicle comprising:
    an engine, and a motor being capable of generating electrical power as power sources;
    an output shaft to which a driving power from at least one of the engine and the motor is transmitted for driving the vehicle in an engine cruise mode in which the vehicle is driven by the engine, or in a motor cruise mode in which the vehicle is driven by the motor;
    a clutch section which is provided between the engine and motor and a pair of axle shafts, and which is adapted to selectively disconnect the driving powers of the engine and the motor; and
    a control section which is adapted to control the clutch section, when the driving mode of the vehicle is switched between the engine cruise mode and the motor cruise mode alternately, so that the engagement degree of the clutch section is once decreased at switching, and then the decreased engagement degree of the clutch section is gradually increased and recovered, wherein the control section is further adapted to control the engine so that fuel supply to the engine is stopped when the driving mode of the vehicle is switched from the engine cruise mode to the motor cruise mode, and the control section is further adapted to control the motor so that the driving power of the motor is increased so as to compensate for friction of the engine due to the fuel cut operation.

* * * * *